(12) United States Patent
Moroo et al.

(10) Patent No.: US 7,720,252 B2
(45) Date of Patent: May 18, 2010

(54) METHOD AND APPARATUS FOR PROCESSING IMAGE, AND PRINTED MATERIAL

(75) Inventors: Jun Moroo, Kawasaki (JP); Tsugio Noda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 963 days.

(21) Appl. No.: 11/476,649

(22) Filed: Jun. 29, 2006

(65) Prior Publication Data

US 2007/0230826 A1  Oct. 4, 2007

(30) Foreign Application Priority Data

Mar. 29, 2006  (JP) .............. 2006-091451

(51) Int. Cl.
G06K 9/00 (2006.01)
H04N 1/40 (2006.01)
G06K 9/32 (2006.01)

(52) U.S. Cl. ............ 382/100; 358/3.28; 358/3.29; 382/295

(58) Field of Classification Search ............ 382/100, 382/112, 162, 164, 168, 171, 173, 232, 276, 382/296, 235, 307, 295; 358/3.28, 3.09, 358/3.23, 3.29, 448, 530; 701/28, 102
See application file for complete search history.

(56) References Cited

U.S. PATENT DOCUMENTS

| 5,204,916 | A | * | 4/1993 | Hamilton et al. ............ 382/296 |
| 5,627,651 | A | * | 5/1997 | Seto et al. .................. 358/3.15 |
| 6,081,345 | A | | 6/2000 | Curry |
| 6,354,737 | B1 | | 3/2002 | Hufe et al. |
| 6,433,896 | B1 | * | 8/2002 | Ueda et al. ................. 358/488 |
| 6,542,579 | B1 | | 4/2003 | Takasawa |
| 6,614,914 | B1 | * | 9/2003 | Rhoads et al. .............. 382/100 |
| 7,006,670 | B2 | * | 2/2006 | Sumikawa et al. .......... 382/112 |
| 7,551,753 | B2 | * | 6/2009 | Kitora ........................ 382/100 |
| 2004/0001608 | A1 | | 1/2004 | Rhoads |
| 2004/0042670 | A1 | | 3/2004 | Moroo et al. |
| 2004/0234139 | A1 | | 11/2004 | Moroo et al. |
| 2005/0117774 | A1 | | 6/2005 | Moroo et al. |

FOREIGN PATENT DOCUMENTS

| EP | 1 480 163 | 11/2004 |
| JP | 11-284833 | 10/1999 |
| JP | 2000-107159 | 4/2000 |
| JP | 2003-513726 | 4/2003 |
| JP | 2004-94551 | 3/2004 |
| JP | 2004-349879 | 12/2004 |
| JP | 2005-161254 | 6/2005 |
| JP | 2005-167316 | 6/2005 |

OTHER PUBLICATIONS

European Search Report mailed Mar. 6, 2007 in corresponding European Patent Application No. 06 11 6422.
Jun Moroo et al., "Method and Apparatus for detecting image area and Computer Product". U.S. Appl. No. 11/322,127, filed Dec. 30, 2005. Assignee: Fujitsu Limited.

* cited by examiner

*Primary Examiner*—Abolfazl Tabatabai
(74) *Attorney, Agent, or Firm*—Fujitsu Patent Center

(57) ABSTRACT

An image processing method of arranging orientation detection information for detecting an image orientation in an image includes arranging the orientation detection information in at least two positions that are symmetric with respect to a center of the image.

23 Claims, 26 Drawing Sheets (1) SET SECONDARY INFORMATION
(CODE "1010110101001010")

(2) READ ORIGINAL IMAGE DATA
(PRIMARY INFORMATION)

(3) DIVIDE ORIGINAL IMAGE DATA INTO BLOCKS (4) EMBED SECONDARY INFORMATION (5) ARRANGE ORIENTATION DETECTION INFORMATION (6) OUTPUT VARIOUS-INFORMATION-EMBEDDED IMAGE DATA AS PRINTED MATERIAL

| 1 | 0 | 1 | 0 | 1 | 1 | 0 | 1 |
|---|---|---|---|---|---|---|---|
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
|   |   |   |   |   |   |   |   |

FIG.7

| 1 | 1 | 1 | 1 | 1 | 1 | 1 | 1 |
|---|---|---|---|---|---|---|---|
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 0 | 1 | 0 | 1 | 1 | 0 | 1 |
| 0 | 1 | 0 | 0 | 1 | 0 | 1 | 0 |
| 1 | 1 | 1 | 1 | 1 | 1 | 1 | 1 |

METHOD AND APPARATUS FOR PROCESSING IMAGE, AND PRINTED MATERIAL

BACKGROUND OF THE INVENTION

1. Field of the Invention

The present invention relates to a technology for arranging orientation detection information for detecting an image orientation in an image.

2. Description of the Related Art

Conventionally, a technology called steganography with which an original image (primary information) is provided with additional information (secondary information) embedded therein that is invisible with human eye and the secondary information is retrieved on the image acquisition side.

For instance, an image processing apparatus disclosed in Japanese Patent Application Laid-Open No. 2004-349879 performs a process on an encoder side in which original image data is divided into several blocks and secondary information is embedded therein in accordance with the magnitude relation of the feature indices of individual blocks (for example, average density, granularity, color saturation, or centralization/decentralization of density). On the other hand, on a decoder, after the image data is divided again into blocks, the secondary information is retrieved based on the magnitude relation of the feature indices of the blocks.

In the above conventional technology, however, there is a problem that an image may not be processed in the correct orientation, as explained below.

Specifically, in the above conventional technology, there is a problem that, if the orientation of an image at the time of embedding secondary information in the original image data (at the time of encoding) is different from the orientation of the image at the time of retrieving the secondary information from the image data in which the secondary information is embedded (at the time of decoding), the image processing apparatus cannot accurately extract the magnitude relation of the feature indices residing in different blocks, which prevents the image from being processed in the correct direction.

In order to solve such a problem, there is a method in which information for detecting the orientation of original image data is embedded in the original image data. In particular, when the image processing apparatus encodes the original image data, information for detecting the orientation of the original image data (orientation detection information) is embedded in addition to the secondary information so that the image orientation can be detected by way of this orientation detection information at the time of decoding to process the image. The embedment of the orientation detection information here means to define, for instance, the magnitude relation of the feature indices indicating "top" and add modifications to the feature indices of blocks in the "top" region of the original image data in accordance with this definition.

However, according to this method, when the magnitude relation of the feature indices residing in blocks other than the orientation detection information coincides with the magnitude relation of the feature indices residing in the blocks for the orientation detection information indicating "top", the image processing apparatus may mistake blocks other than the orientation detection information for the orientation detection information blocks, depending on the locations of the non-orientation detection information blocks, and make an erroneous judgment on the orientation of the image. Thus, there is a problem that the magnitude relation of the feature indices residing in the blocks cannot be correctly extracted, which prevents the image from being processed in the correct direction.

The above problem is not limited to the steganography but may arise in other types of image processing apparatuses (optical character reader (OCR), for instance) that do not employ the magnitude relation of the feature indices.

SUMMARY OF THE INVENTION

It is an object of the present invention to at least partially solve the problems in the conventional technology.

An image processing method according to one aspect of the present invention is for arranging orientation detection information for detecting an image orientation in an image. The image processing method includes arranging the orientation detection information in at least two positions that are symmetric with respect to a center of the image.

An image processing method according to another aspect of the present invention is for detecting an image orientation by using orientation detection information for detecting the image orientation arranged in an image. The image processing method includes detecting the image orientation by using the orientation detection information from the image in which the orientation detection information is arranged in at least two positions that are symmetric with respect to a center of the image.

An image processing apparatus according to still another aspect of the present invention arranges orientation detection information for detecting an image orientation in an image. The image processing apparatus includes an orientation-detection-information arranging unit that arranges the orientation detection information in at least two positions that are symmetric with respect to a center of the image.

An image processing apparatus according to still another aspect of the present invention detects an image orientation by using orientation detection information for detecting the image orientation arranged in an image. The image processing apparatus includes an orientation detecting unit that detects the image orientation by using the orientation detection information from the image in which the orientation detection information is arranged in at least two positions that are symmetric with respect to a center of the image.

A printed material according to still another aspect of the present invention includes an image printed thereon. The image is created by an image processing method of arranging orientation detection information for detecting an image orientation in the image. The image processing method includes arranging the orientation detection information in at least two positions that are symmetric with respect to a center of the image.

A computer-readable recording medium according to still another aspect of the present invention stores therein an image processing program for arranging orientation detection information for detecting an image orientation in an image. The image processing program causes a computer to execute arranging the orientation detection information in at least two positions that are symmetric with respect to a center of the image.

A computer-readable recording medium according to still another aspect of the present invention stores therein an image processing program for detecting an image orientation by using orientation detection information for detecting the image orientation arranged in an image. The image processing program causes a computer to execute detecting the image orientation by using the orientation detection information from the image in which the orientation detection information is arranged in at least two positions that are symmetric with respect to a center of the image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram for explaining original image data;

FIG. 6 is a diagram for explaining secondary-information-embedded image data;

FIG. 7 is a diagram for explaining various-information-embedded image data;

DETAILED DESCRIPTION OF THE PREFERRED EMBODIMENTS

Exemplary embodiments of the present invention will be explained in detail below with reference to the accompanying drawings.

The "primary information" in the present embodiments indicates original image data. Conventionally, a technology called steganography is known, with which original image data is provided with additional information embedded therein that is invisible with human eye and the additional information is retrieved on the image acquisition side. In such a technology, data in which additional information is embedded is the primary information.

The "secondary information" in the present embodiments is the additional information to be embedded in the primary information. For instance, additional information uniquely embedded in a photograph, which is the primary information, may be used as evidence that, when the photograph is photocopied without authorization, a photograph obtained by photocopying is unauthorized. The secondary information according to the present embodiment is a 16-bit code represented as "1010110101001010", for example.

The main feature of the image processing apparatus according to a first embodiment of the present invention resides in that an image can be processed in the correct direction by arranging orientation detection information in the image to detect the orientation of the image.

Figure 1:
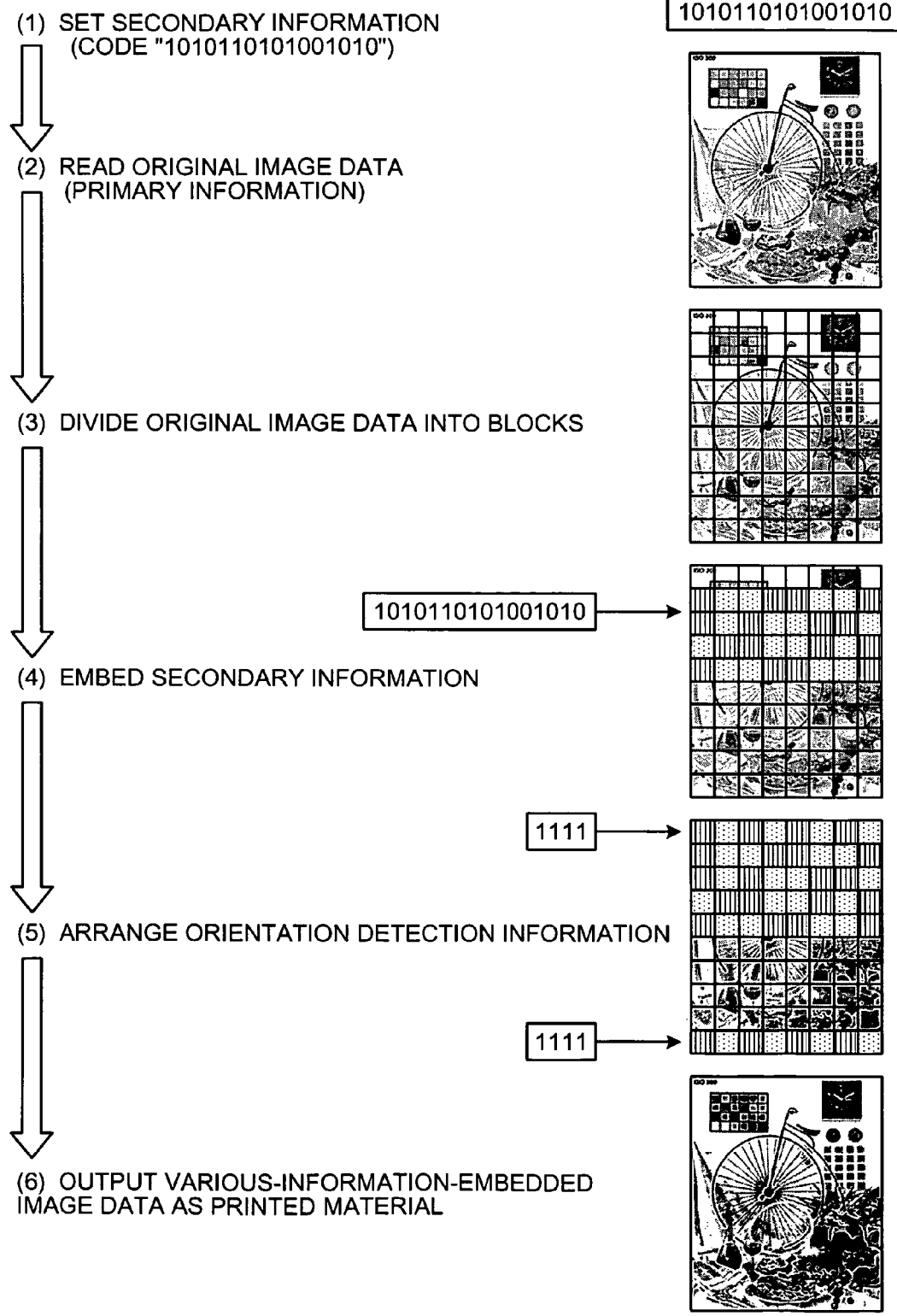
FIGS. 1 to 3 are diagrams for explaining the overview and the features of an image processing apparatus according to a first embodiment of the present invention.
Figure 2:
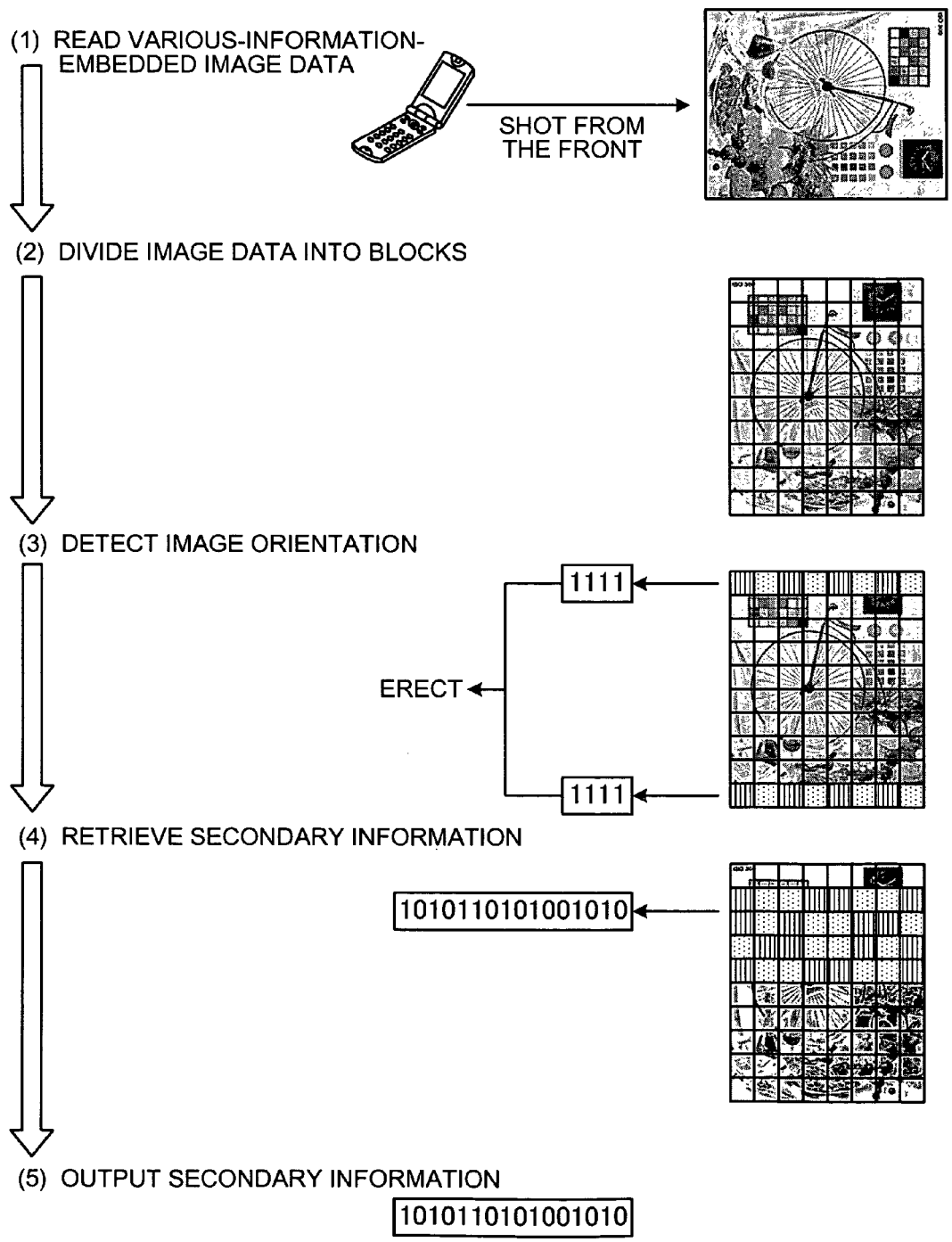
Figure 3:
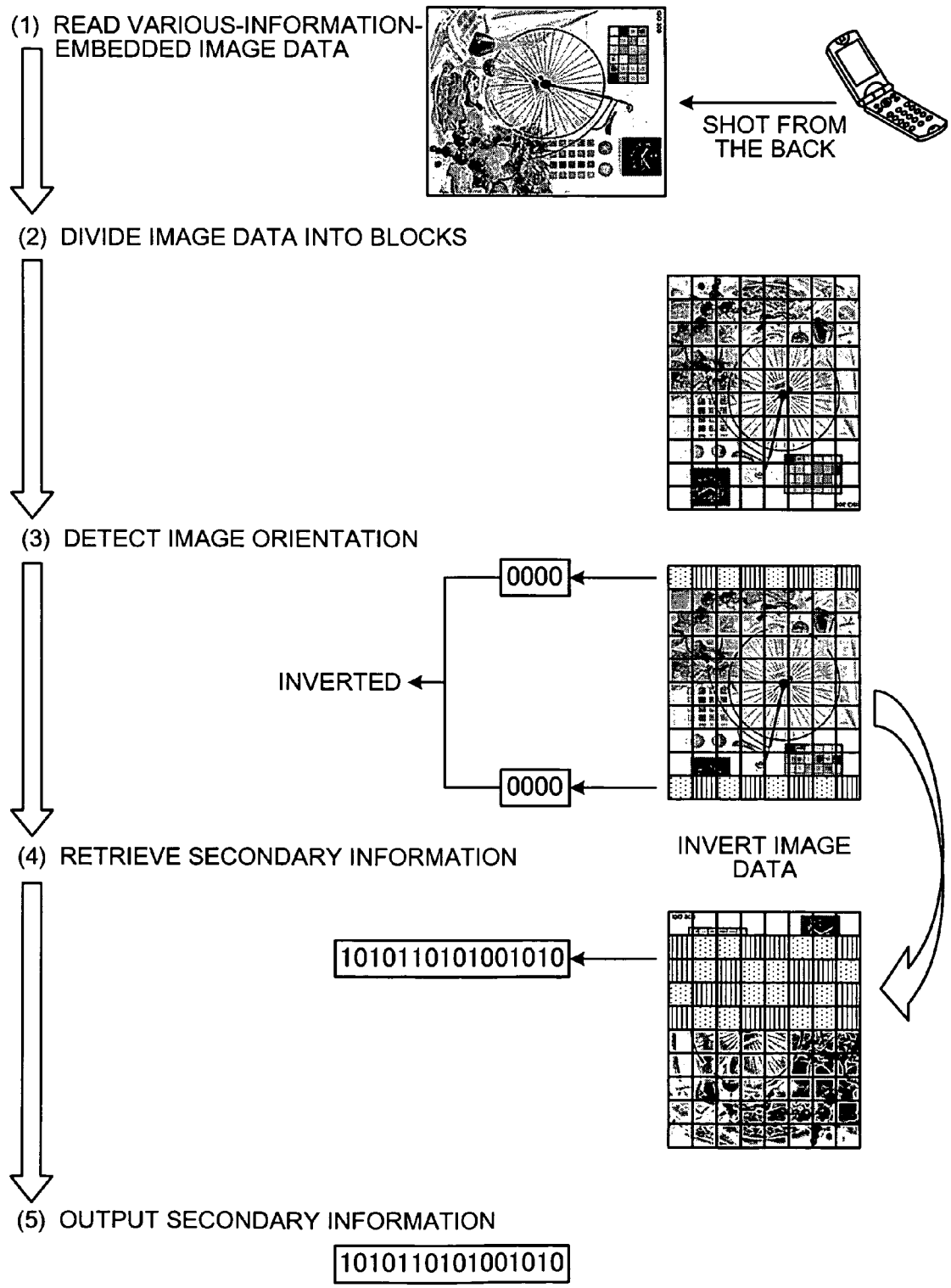

FIGS. 1 to 3 are diagrams for explaining the overview and the features of an image processing apparatus according to the first embodiment. As shown in FIG. 1, the image processing apparatus defines the 16-bit code represented as "1010110101001010", for example, as secondary information in the process performed on the encoder side (see (1) in FIG. 1). Then, the image processing apparatus reads original image data (primary information) in the process on the encoder side (see (2) in FIG. 1). It should be noted that the original image data is image data generated in a predetermined format (e.g. joint photographic expert group (JPEG) or graphics interchange format (GIF)). Following this, the image processing apparatus divides the original image data into blocks in the process on the encoder side (see (3) in FIG. 1).

Thereafter, the image processing apparatus embeds the secondary information in the primary information in the process on the encoder side (see (4) in FIG. 1). According to the present embodiment, one bit in the 16-bit code is represented by a pair of blocks that are adjacent to each other and have the feature indices one of which is larger than the other. In other words, "1" is represented, for example, by a pair of blocks that have the feature indices the magnitude relation of which is "the left block<the right block", while "0" is represented by a pair of blocks that have the feature indices the magnitude relation of which is "the left block>the right block". To embed the 16-bit code "1010110101001010", the feature indices of 16 pairs of blocks are changed to match the magnitude relation of either "1" or "0". In Item (4) in FIG. 1, the secondary information embedded in the primary information by the image processing apparatus is visibly illustrated, for convenience of explanation. In actuality, however, the feature index of each block is changed to the extent that the quality of the original image data is not significantly deteriorated so that it is unnoticeable to the naked eye, despite the fact that there are blocks with the feature indices modified in part of the image.

The image processing apparatus arranges orientation detection information in the primary information in the process on the encoder side (see (5) in FIG. 1). According to the present embodiment, a multiple number of bits "1" are arranged at the top end and the bottom end of the image as information that indicates that the image data is "erect". In other words, as described above, a bit "1" is represented by a pair of blocks that have the feature indices the magnitude relation of which is "the left block<the right block", and the feature indices are changed in a multiple number of pairs of blocks at the top end and the bottom end of the image so that the magnitude relation of the feature indices in the left and right blocks of each pair match "1". Moreover, in item (5) in FIG. 1, the orientation detection information arranged by the image processing apparatus is visibly illustrated, for convenience of explanation. In actuality, however, the feature index in each block is changed to the extent that the quality of the original image data is not significantly deteriorated so that it is unnoticeable to the naked eye, despite the fact that there are blocks with the feature indices modified in part of the image.

In such a manner, the image processing apparatus outputs, in the process on the encoder side, the image data that includes the primary information with various information (the secondary information and the orientation detection information) embedded therein, as printed material (see (6) in FIG. 1).

As illustrated in FIG. 2, the image data including the primary information with the various information embedded therein is read, for example, by a camera equipped in a camera phone to the decoder of the image processing apparatus (see (1) in FIG. 2). In the case of (1) in FIG. 2, because the image data including the primary information with the various information embedded therein is obtained by photographing from the front by the camera equipped in the camera phone, the decoder of the image processing apparatus acquires the image data whose image orientation is "erect". However, the decoder of the image processing apparatus has not yet detected the image orientation of the obtained image data being "erect" at this step. Then, the decoder of the image processing apparatus divides the image data into blocks (see (2) in FIG. 2).

Thereafter, the decoder of the image processing apparatus detects the image orientation of the image data by way of several pieces of the orientation detection information arranged at the top end and the bottom end of the image data (see (3) in FIG. 2). In other words, as described above, because the bits of "1" are arranged as information indicating that the image orientation is "erect" according to the present embodiment, the decoder of the image processing apparatus detects the image orientation of the image data being "erect" by way of the several pairs of blocks representing the bits of "1" arranged at the top end and the bottom end of the image data. Here, the decoder of the image processing apparatus recognizes only the blocks of the orientation detection information as blocks of the orientation detection information in either case of the image orientation being "erect" or "inverted", and does not mistake any blocks other than the orientation detection information for blocks of the orientation detection information.

In such a manner, the decoder of the image processing apparatus retrieves the 16-bit code ("1010110101001010"), which is the secondary information, from the image data upon this detection (see (4) in FIG. 2), and outputs the secondary information (see (5) in FIG. 2).

Moreover, as illustrated in FIG. 3, when the image data including the primary information in which the secondary information is embedded is obtained by photographing not from the front, but from the back, by a camera equipped in a camera phone, the decoder of the image processing apparatus obtains image data whose image orientation is "inverted" (see (1) in FIG. 3). However, the decoder of the image processing apparatus has not yet detected the image orientation of the obtained image data being "inverted" at this step. Then, the decoder of the image processing apparatus divides the image data into blocks (see (2) in FIG. 3).

Thereafter, in a similar manner to the case of the image orientation of the image data being "erect", the decoder of the image processing apparatus detects the image orientation of the image data by way of the several pieces of orientation detection information arranged at the top end and the bottom end of the image data (see (3) in FIG. 2). Then, despite the bits of "1" arranged as information indicating that the image data is "erect" according to the present embodiment, the decoder of the image processing apparatus detects several bits of "0" arranged at the top end and the bottom end of the image data. The decoder of the image processing apparatus thereby detects the image orientation of the image data being "inverted".

In such a manner, the decoder of the image processing apparatus inverts the image data upon this detection, retrieves the 16-bit code ("1010110101001010"), which is the secondary information, from the image data (see (4) in FIG. 3), and outputs the secondary information (see (5) in FIG. 3).

Thus, the decoder of the image processing apparatus according to the first embodiment recognizes only the blocks of the orientation detection information as blocks of orientation detection information in either case of the image orientation being "erect" and "inverted", and does not mistake any blocks other than the orientation detection information for blocks of orientation detection information. Because misjudgment of the image orientation in increments of 180 degrees is avoided, an image can be processed in the correct orientation, as described above on the main characteristic feature.

Figure 4:
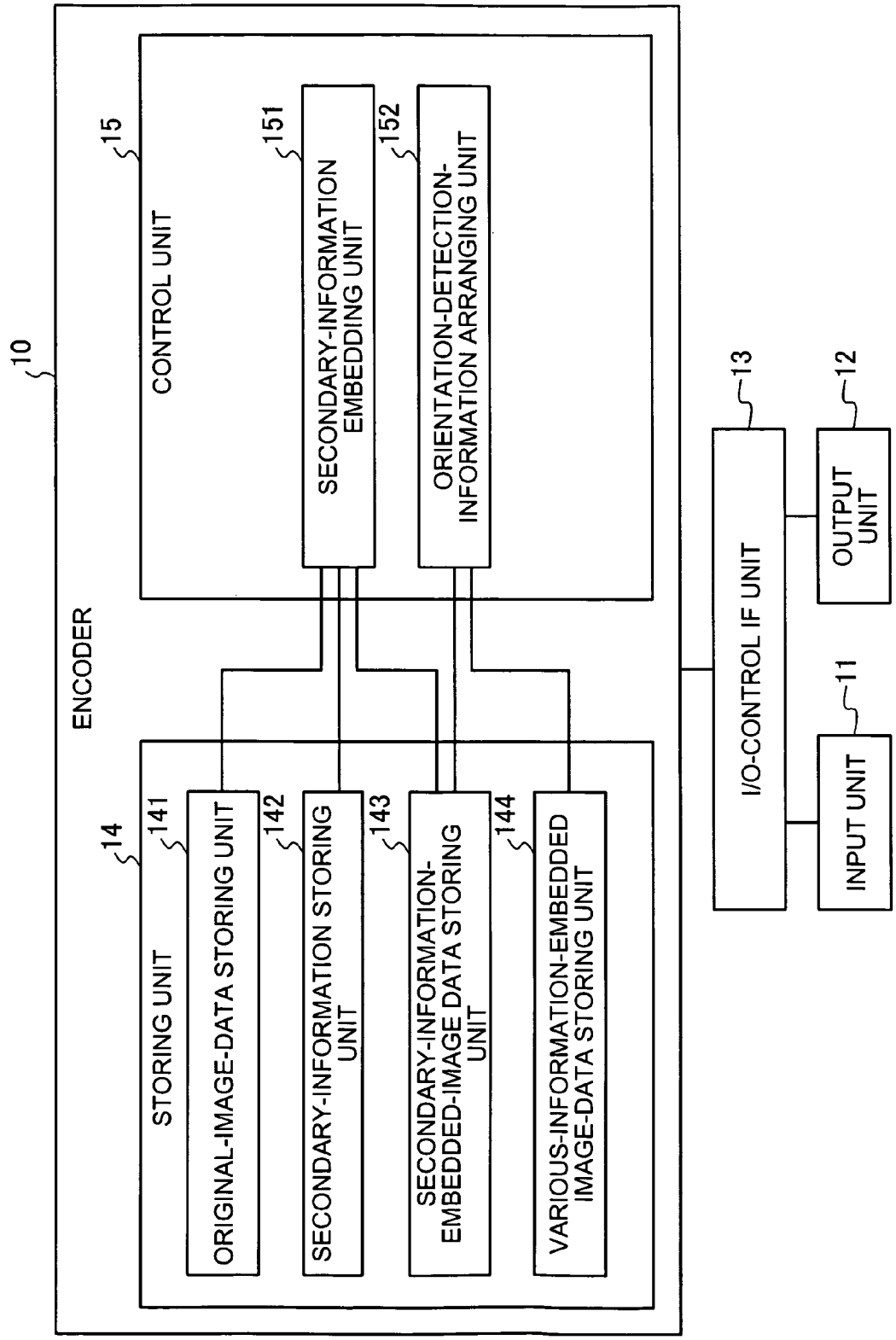
FIG. 4 is a block diagram of the structure of an encoder according to the first embodiment.
Figure 8:
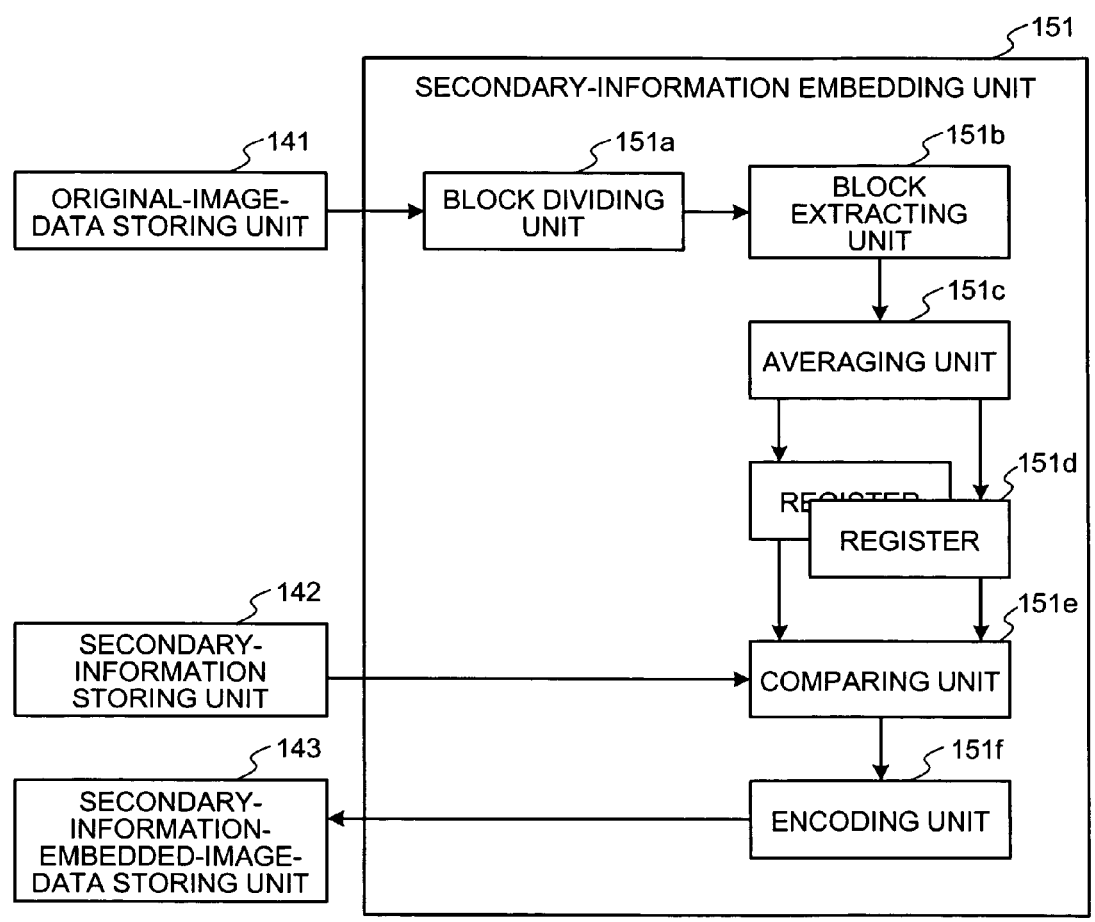
FIG. 8 is a block diagram of the structure of a secondary-information embedding unit according to the first embodiment.
Figure 9:
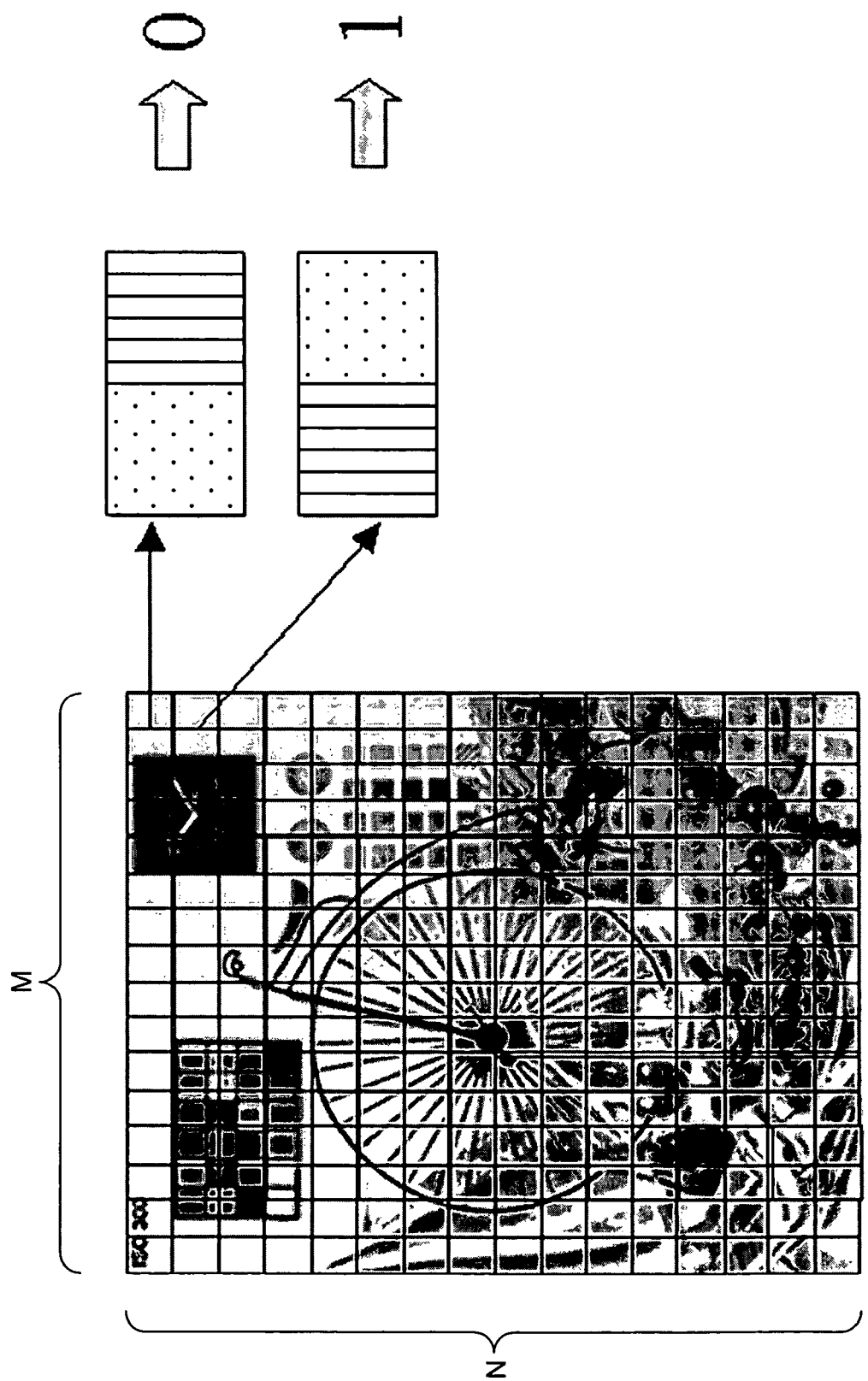
FIG. 9 is a diagram for explaining the image data divided into blocks.
Figure 10:
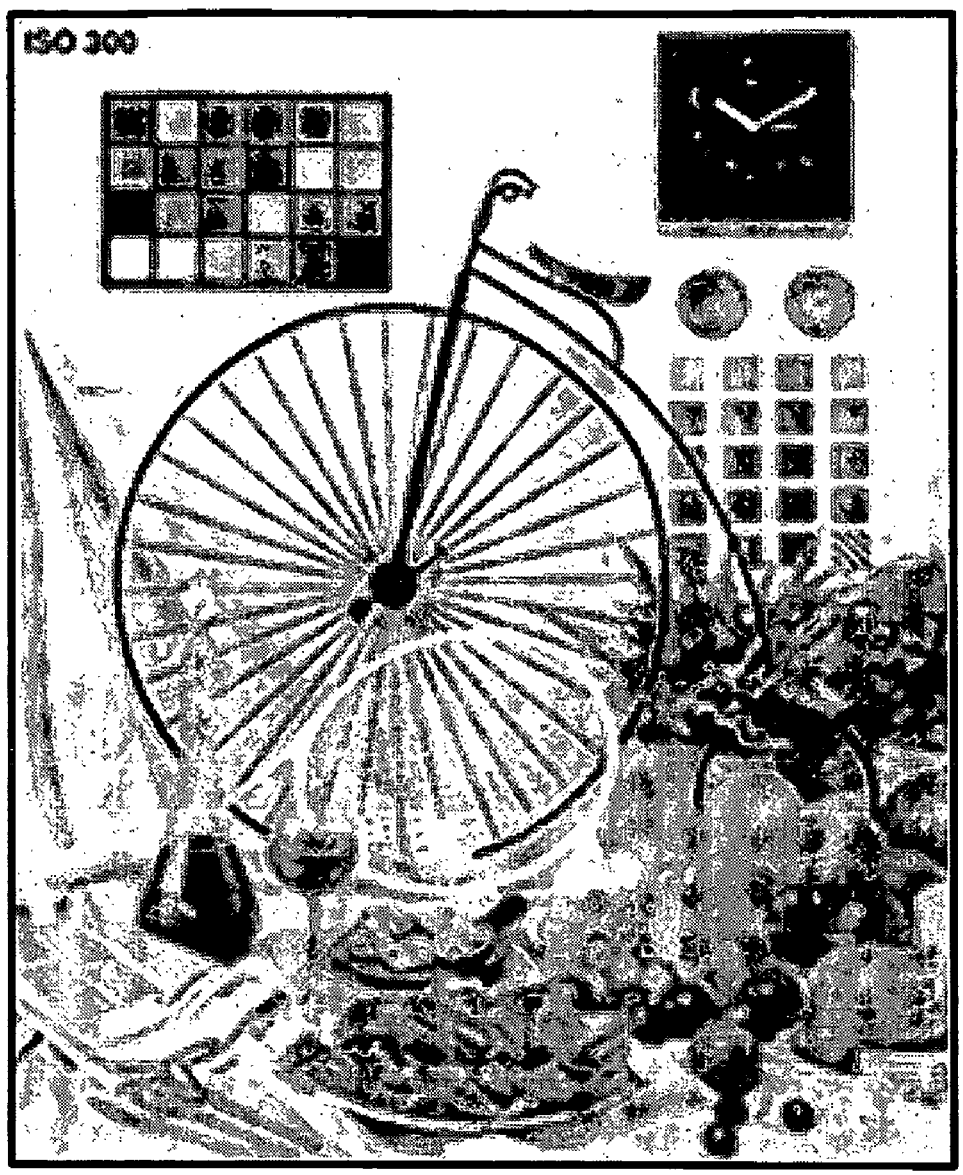
FIG. 10 is a diagram for explaining generated printed material.
Figure 11:
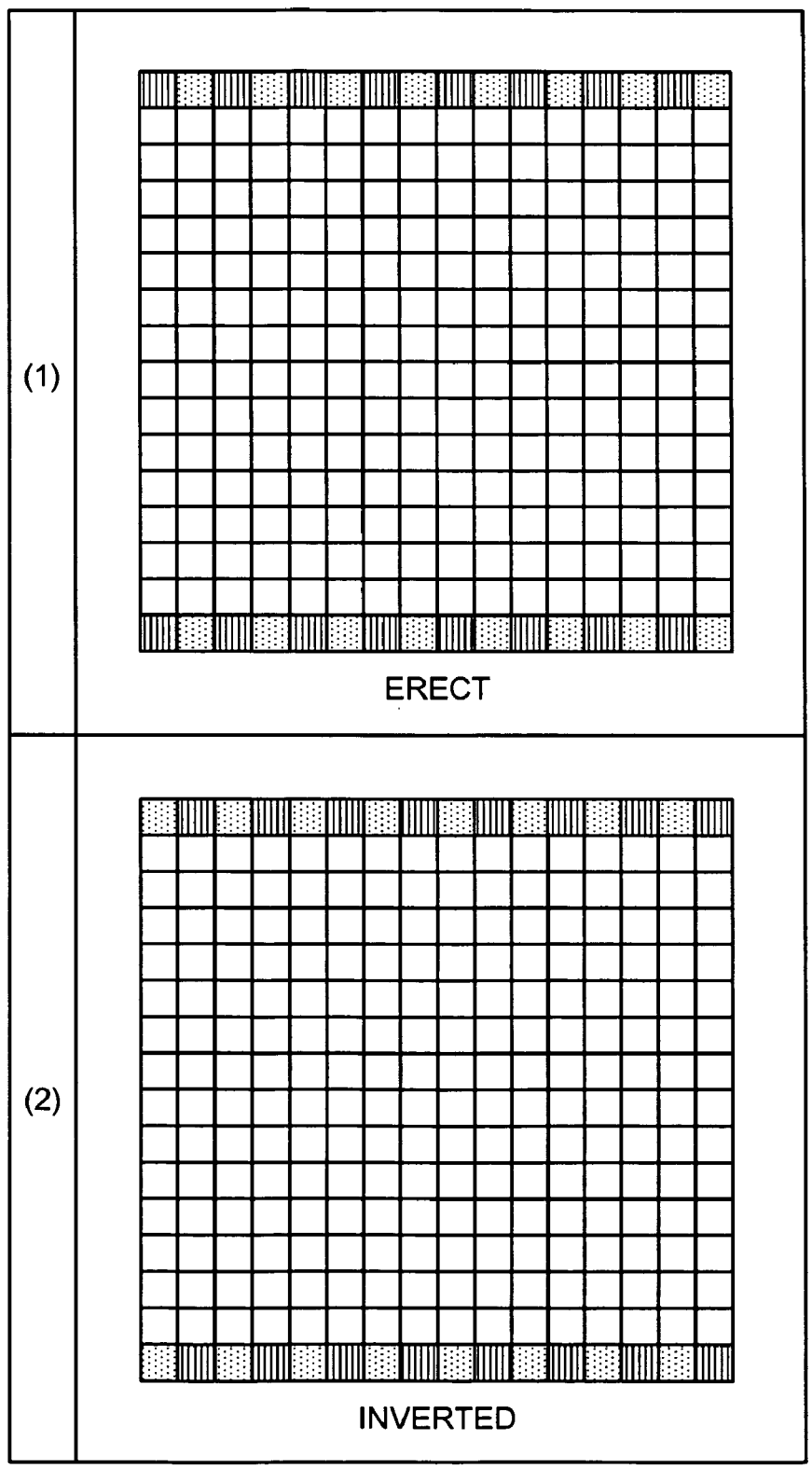
FIG. 11 is a diagram for explaining the image data with the orientation detection information arranged on the top end and the bottom end thereof.
Figure 12:
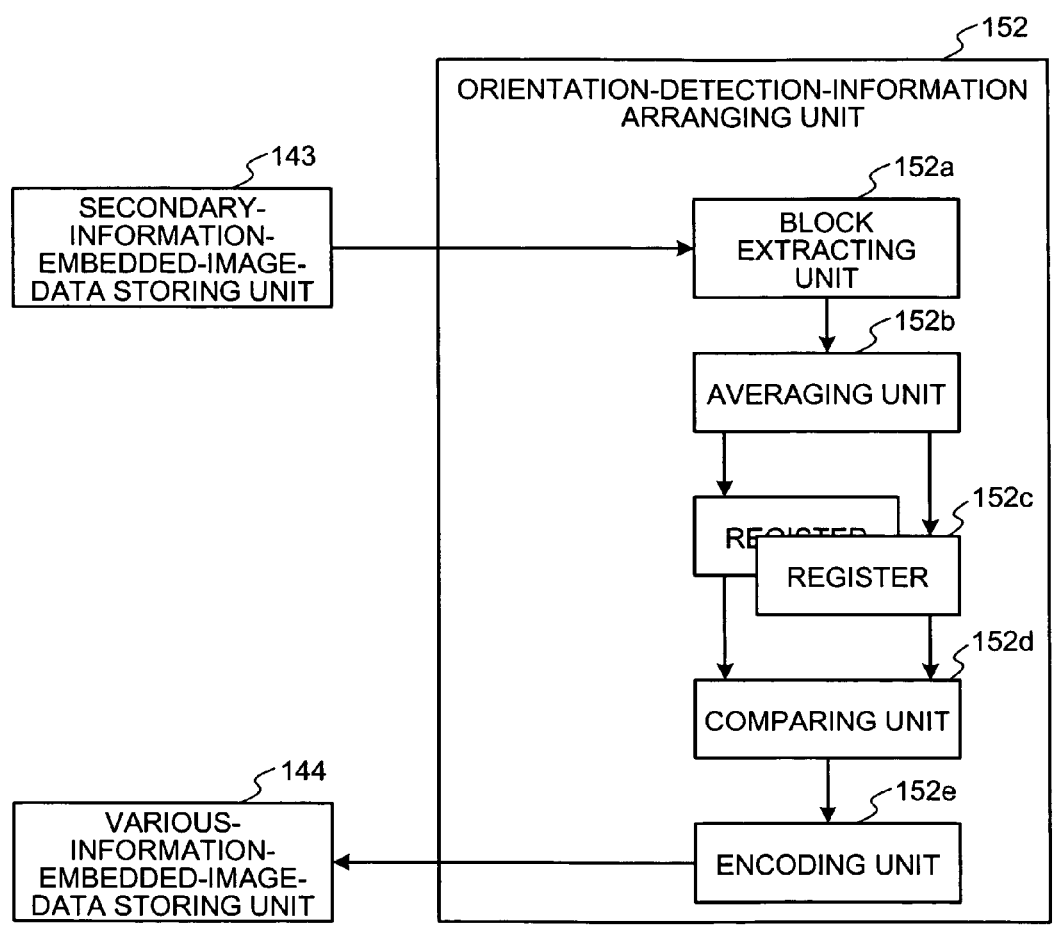
FIG. 12 is a block diagram of the structure of an orientation-detection-information arranging unit according to the first embodiment.

FIG. 4 is a block diagram for explaining the structure of an encoder 10 according to the first embodiment. FIG. 5 is a diagram for explaining the original image data. FIG. 6 is a diagram for explaining the image data with the secondary information already embedded therein. FIG. 7 is a diagram for explaining the image data with various information already embedded therein. FIG. 8 is a block diagram for explaining the structure of a secondary-information embedding unit 151 according to the first embodiment. FIG. 9 is a diagram for explaining the image data divided into blocks. FIG. 10 is a diagram for explaining the produced printed material. FIG. 11 is a diagram for explaining the image data with the orientation detection information arranged on the top end and the bottom end thereof. FIG. 12 is a block diagram for explaining the structure of an orientation-detection-information arranging unit 152 according to the first embodiment.

As illustrated in FIG. 4, the encoder 10 is configured with an input unit 11, an output unit 12, an input/output (I/O)-control IF unit 13, a storing unit 14, and a control unit 15.

The input unit 11 inputs primary information and secondary information. The primary information is the original image data produced in a predetermined format (such as joint photographic expert group (JPEG) and graphics interchange format (GIF)) by way of a scanner or a recording medium, or through communications. The secondary information is a 16-bit code represented as "1010110101001010", for example, on a keyboard or the like. It should be noted that the original image data input through the input unit 11 is stored in an original-image-data storing unit 141, which will be described later, and the secondary information input through the input unit 11 is stored in a secondary-information storing unit 142, which will be described later.

The output unit 12 outputs image data including primary information in which various information (secondary information and orientation detection information) is embedded. In other words, the output unit 12 outputs, to a printer as printed material or to a monitor, the image data stored in a various-information-embedded-image-data storing unit 144. The image data includes a 16-bit code represented as "1010110101001010", for example, embedded as secondary information, and several bits of "1" arranged at the top end and the bottom end of the image as orientation detection information.

The I/O-control IF unit 13 controls data transfer between the input unit 11/the output unit 12 and the storing unit 14/the control unit 15.

The storing unit 14 stores data that is to be used in various processes performed by the control unit 15. Specifically, as illustrated in FIG. 4, it includes the original-image-data storing unit 141, the secondary-information storing unit 142, a secondary-information-embedded-image-data storing unit 143, and the various-information-embedded-image-data storing unit 144, as units that are closely related to the present invention.

In the storing unit 14 such configured, the original-image-data storing unit 141 stores original image data that is to be encoded by the encoder 10 and is input by the input unit 11. More specifically, the original image data produced in a predetermined format (such as JPEG and GIF) is stored, as exemplified in FIG. 5.

The secondary-information storing unit 142 stores secondary information that is to be embedded in the original image data and is input by the input unit 11. For instance, a 16-bit code represented as "1010110101001010" or the like is stored.

The secondary-information-embedded-image-data storing unit 143 stores image data including the original image data in which the secondary information is embedded. In other words, image data in which the secondary information is embedded by the secondary-information embedding unit 151 that will be described later is stored. In particular, as illustrated in FIG. 6, a 16-bit code represented as "1010110101001010" or the like is repeatedly embedded in blocks other than the top end and the bottom end of the image of the image data in which the secondary information is embedded.

The various-information-embedded-image-data storing unit 144 stores image data including the original image data in which various information (secondary information and orientation detection information) is embedded. In other words, image data in which the orientation detection information is arranged by the orientation-detection-information arranging unit 152 that will be described later is stored. In particular, as illustrated in FIG. 7, a 16-bit code represented as "1010110101001010", for example, is repeatedly embedded in blocks other than the top end and the bottom end of the image of the image data in which the various information is embedded. Further, several bits of "1" are arranged, for instance, as information that indicates the original image data is "erect" in the blocks at the top end and the bottom end of the image.

The control unit 15 controls the encoder 10 to execute various processes, and includes the secondary-information embedding unit 151 and an orientation-detection-information arranging unit 152, which are particularly in close relation to the present invention. It should be noted that the orientation-detection-information arranging unit 152 corresponds to an "arranging orientation detection information step" recited in the claims.

In the control unit 15, the secondary-information embedding unit 151 is a processing unit that embeds the secondary information in the original image data. In particular, the secondary-information embedding unit 151 embeds the secondary information stored in the secondary-information storing unit 142 in the original image data stored in the original-image-data storing unit 141, and causes the secondary-information-embedded-image-data storing unit 143 to store it.

As shown in FIG. 8, the secondary-information embedding unit 151 includes a block dividing unit 151a, a block extracting unit 151b, an averaging unit 151c, registers 151d, a comparing unit 151e, and an encoding unit 151f, as illustrated in FIG. 8.

The block dividing unit 151a divides the original image data stored in the original-image-data storing unit 141 into N rows by M columns of blocks, as illustrated in FIG. 9.

The block extracting unit 151b sequentially extracts, from blocks of the original image data divided into blocks by the block dividing unit 151a except for those at the top end and the bottom end, pairs of blocks that are adjacent to each other and have feature indices one of which is larger than the other. The block extracting unit 151b outputs a density distribution of each of the left blocks and the right blocks as block density data.

The averaging unit 151c obtains average density data of the left block and average density data of the right block, based on the block density data output by the block extracting unit 151b, and sequentially stores the values in the corresponding registers 151d.

Based on the magnitude relation between the average density data of the left block stored in the register 151d and the average density data of the right block stored in the register 151d, the comparing unit 151e determines the corresponding bit and compares the determination result with the bits of the 16-bit code, which is the secondary information stored in the secondary-information storing unit 142. In other words, according to the present embodiment, "1" is represented by a pair of blocks that have the feature indices that meet "left block<right block", while "0" is represented by a pair of blocks that have the feature indices that meet "left block>right block". Thus, the bit for a pair of blocks that meet "average density of left block<average density of right block" is determined as "1", while the bit for a pair of blocks that meet "average density of left block>average density of right block" is determined as "0". Then, the determination result is sequentially compared with the bits of the 16-bit code, "1010110101001010".

The encoding unit 151f executes a process for embedding the 16-bit code in the original image data, based on the comparison result produced by the comparing unit 151e. In particular, when the comparison result produced by the comparing unit 151e is "congruent", the encoding unit 151f maintains the magnitude relation between the average density of the left block and the average density of the right block. On the other hand, when the comparison result is "incongruent", changes are made to the densities in such a manner that the magnitude relation corresponds to the bit of the code. Such generated image data is stored in the secondary-information-embedded-image-data storing unit 143. To make changes to the densities here means that, when the comparison result produced by the comparing unit 151e is "incongruent", a change is made to the densities the left and right blocks in a pair in such a manner that the magnitude relation thereof corresponds to "1" or "0". It should be noted that the encoding unit 151f determines whether the difference between the densities of the left block and the right block is equal to or less than the predetermined maximum threshold value. If it is equal to or less than the predetermined maximum threshold value, the encoding unit 151f changes the densities. However, if it exceeds the predetermined maximum threshold value, no change is made to the densities. As a result, changes are made to the densities of the blocks to the extent that the quality of the original image is not significantly deteriorated in reality, although FIG. 6 is a diagram for explaining the image data including the original image data in which the secondary information is embedded in a visible manner for the convenience of explanation. Hence, as illustrated in FIG. 10, blocks with changed densities exist in part of the image, but they are indiscernible with the naked eye.

Referring back to FIG. 4, the orientation-detection-information arranging unit 152 arranges the orientation detection information in the original image data that is subjected to the encoding by the encoder 10. In particular, the orientation-detection-information arranging unit 152 arranges the orientation detection information in the image data stored in the secondary-information-embedded-image-data storing unit 143 and causes the various-information-embedded-image-data storing unit 144 to store it. According to the present embodiment, several bits of "1" are arranged at the top end and the bottom end of the image as the orientation detection information indicating that the original image data is "erect". Then, because the bit "1" is represented by a pair of blocks that have the feature indices whose magnitude relation meets "left block<right block", the orientation detection information can be illustrated in a visible manner, as in FIG. 11.

As shown in FIG. 12, the orientation-detection-information arranging unit 152 includes a block extracting unit 152a, an averaging unit 152b, registers 152c, a comparing unit 152d, and an encoding unit 152e, as illustrated in FIG. 12.

The block extracting unit 152a sequentially extracts, from the top end and the bottom end of the original image data divided into blocks by the block dividing unit 151a, pairs of blocks that are adjacent to each other and have feature indices that exhibit a relation that one is larger than the other. The block extracting unit 152a outputs a density distribution of each of the left block and the right block as block density data.

The averaging unit 152b obtains average density data of the left block and average density data of the right block, based on the block density data output by the block extracting unit 152a, and sequentially stores the values in the corresponding registers 152c.

Based on the magnitude relation between the average density data of the left block stored in the register 152c and the average density data of the right block stored in the register 152c, the comparing unit 152d determines the corresponding bit and compares the determination result with the bits of the orientation detection information. According to the present embodiment, several bits of "1" are arranged at the top end and the bottom end of the image as information indicating that the original image data is "erect". Thus, as mentioned above, the bit for a pair of blocks that meet "average density of left block<average density of right block" is determined as "1", while the bit for a pair of blocks that meet "average density of left block>average density of right block" is determined as "0". Then, the determination result is sequentially compared with the bits of the orientation detection information, "11111111"

The encoding unit 152e executes a process for arranging the orientation detection information in the image data, based on the comparison result produced by the comparing unit 152d. In particular, when the comparison result produced by the comparing unit 152d is "congruent", the encoding unit 152e maintains the magnitude relation between the average density of the left block and the average density of the right block. On the other hand, when the comparison result is "incongruent", changes are made to the densities to meet the magnitude relation represented by the bit "1", and stores thus generated image data in the various-information-embedded-image-data storing unit 144. To make changes to the densities here means to change, when the comparison result produced by the comparing unit 152d is "incongruent", the densities of the left and right blocks of a pair in such a manner that the magnitude relation thereof corresponds to "1". It should be noted that the encoding unit 152e determines whether the difference between the densities of the left block and the right block is equal to or less than the predetermined maximum threshold value. If it is equal to or less than the predetermined maximum threshold value, the encoding unit 152e changes the densities. However, if it exceeds the predetermined maximum threshold value, no change is made to the densities. As a result, changes are actually made to the densities of the blocks to the extent that the quality of the original image is not significantly deteriorated in reality, although FIG. 7 is a diagram for explaining the image data including the original image data in which the various information (the secondary information and the orientation detection information) is embedded in a visible manner for the convenience of explanation. Hence, as illustrated in FIG. 10, blocks with density changes exist in part of the image, but they are indiscernible with the naked eye.

Figure 13:
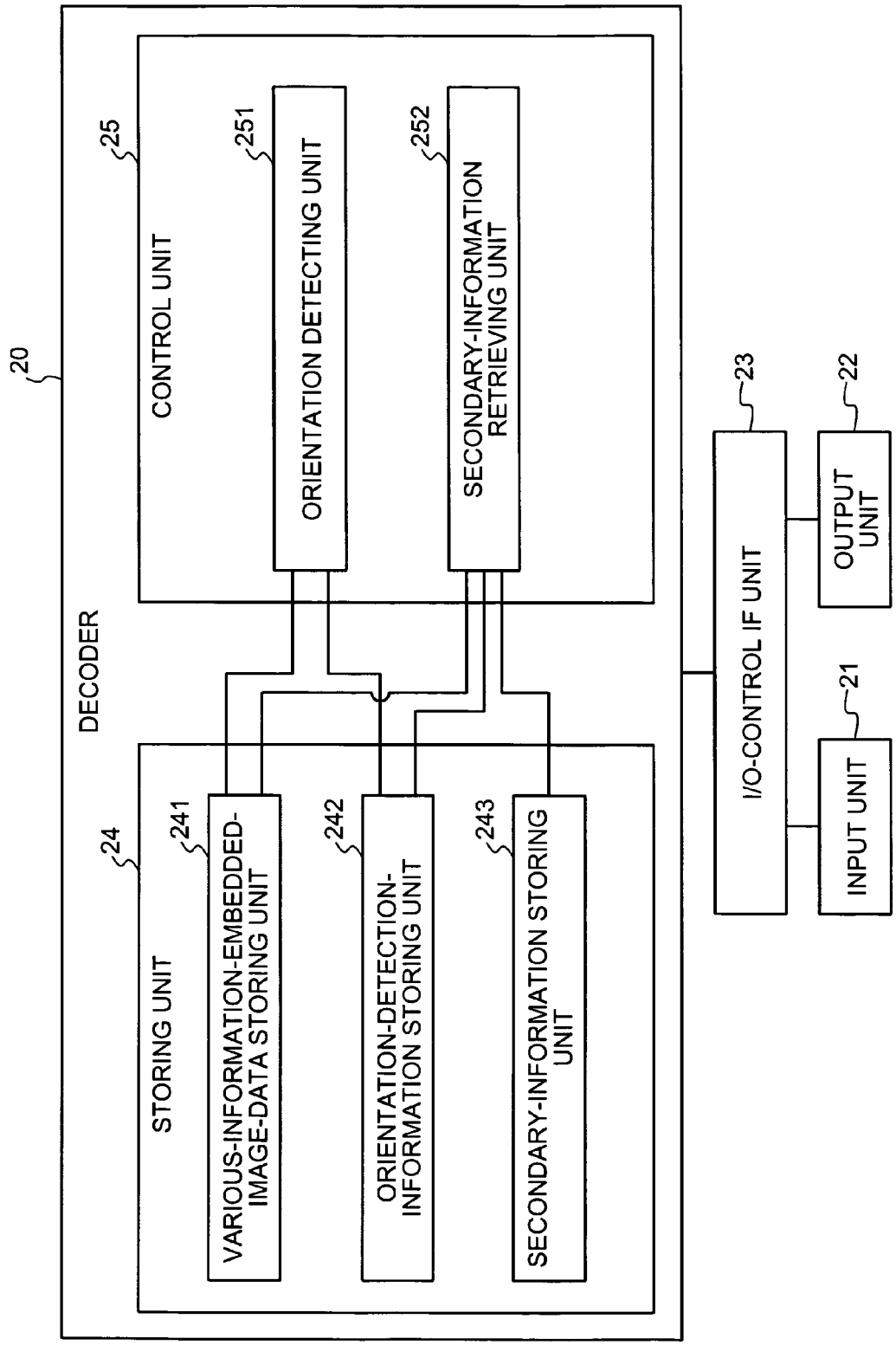
FIG. 13 is a block diagram of the structure of a decoder according to the first embodiment.
Figure 14:
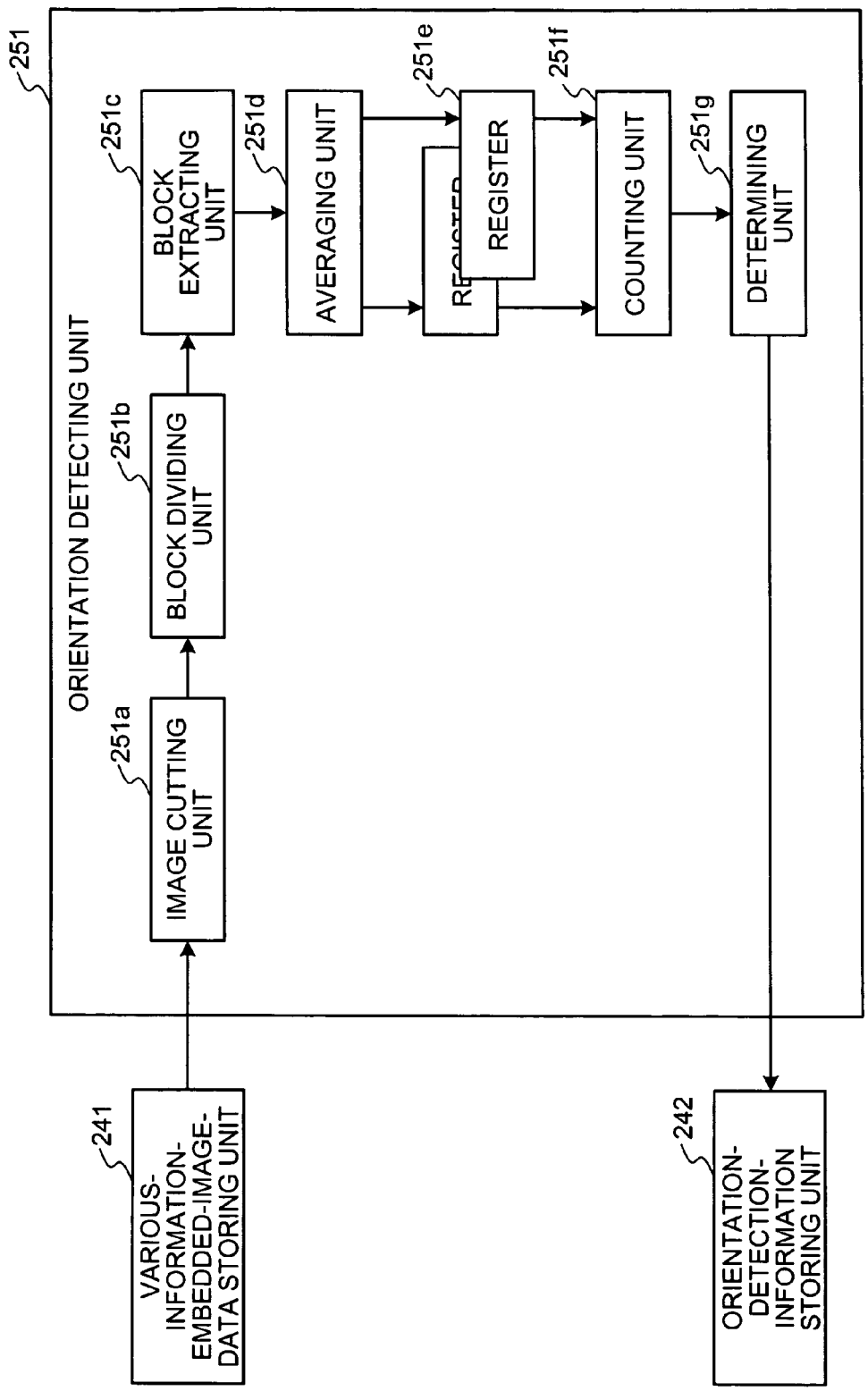
FIG. 14 is a block diagram of the structure of an orientation detecting unit according to the first embodiment.
Figure 15:
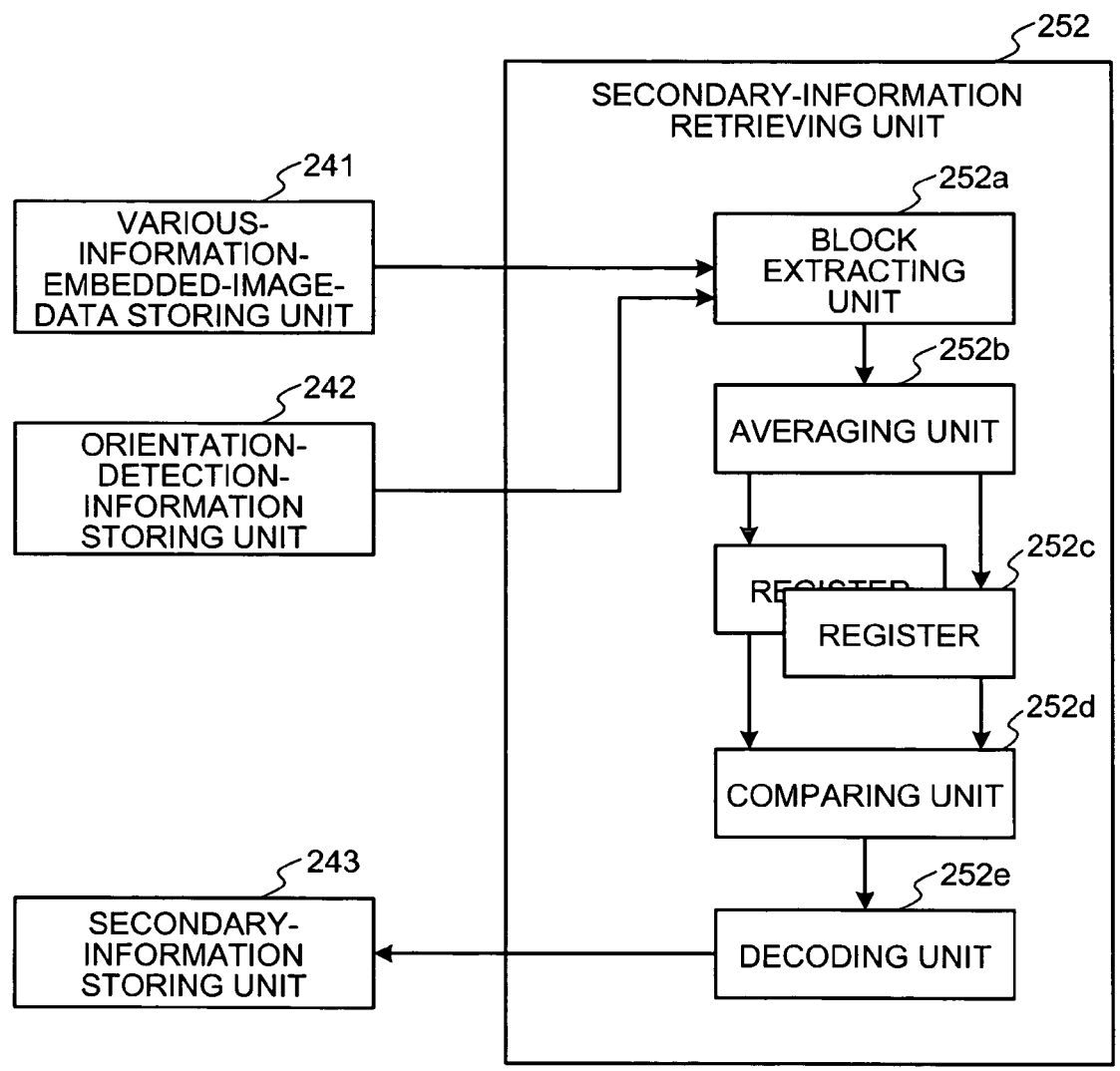
FIG. 15 is a block diagram of the structure of a secondary-information retrieving unit according to the first embodiment.

FIG. 13 is a block diagram of the structure of a decoder 20 according to the first embodiment. FIG. 14 is a block diagram of the structure of an orientation detecting unit 251 according to the first embodiment. FIG. 15 is a block diagram of the structure of a secondary-information retrieving unit 252 according to the first embodiment. It should be noted that the decoder is configured by a camera phone, a personal computer, or the like.

As illustrated in FIG. 13, the decoder 20 includes an input unit 21, an output unit 22, an I/O-control IF unit 23, a storing unit 24, and a control unit 25.

The input unit 21 inputs the various-information-embedded image data. In particular, the input unit 21 inputs, with a camera equipped in a camera phone, a digital camera, a scanner, or the like, the image data including the original image data in which the various information (the secondary information and the orientation detection information) is embedded in the process performed on the side of the encoder 10 of the image processing apparatus. It should be noted that the various-information-embedded image data input by the input unit 21 is stored in a various-information-embedded-image-data storing unit 241, which will be explained later.

The output unit 22 outputs the secondary information. In other words, the output unit 22 outputs a 16-bit code represented, for example, as "1010110101001010" on a display of a camera phone or a monitor of a personal computer.

The I/O-control IF unit 23 controls data transfer between the input unit 21/the output unit 22 and the storing unit 24/the control unit 25.

The storing unit 24 stores data that is to be used in various processes performed by the control unit 25. As illustrated in FIG. 13, it includes the various-information-embedded-image-data storing unit 241, an orientation-detection-information storing unit 242, and a secondary-information storing unit 243, as units that are particularly in close relation to the present invention.

In the storing unit 24 such configured, the various-information-embedded-image-data storing unit 241 stores image data including the original image data in which the various information (secondary information and orientation detection information) is embedded through the process performed on the side of the encoder 10, which is the various-information-embedded image data input by the input unit 21. In particular, as shown in FIG. 7, a 16-bit code represented, for example, as "1010110101001010" is repeatedly embedded in the blocks of the image of the image data in which the various information is embedded, except for blocks at the top end and the bottom end thereof. In addition, several bits of "1" are arranged in the blocks at the top end and the bottom end of the image as information indicating that the original image data is "erect".

The orientation-detection-information storing unit 242 stores information in relation to the image orientation of the image data. In other words, it stores information in relation to the image orientation (such as "erect", "inversed", and "unclear") detected by the orientation detecting unit 251, which will be explained later.

The secondary-information storing unit 243 stores the secondary information embedded in the original image data in the process performed on the side of the encoder 10. In other words, it stores the secondary information retrieved by the secondary-information retrieving unit 252, which will be explained later. In particular, it is a 16-bit code represented, for example, as "1010110101001010".

The control unit 25 controls the decoder 20 to execute various processes. Specifically, as illustrated in FIG. 13, it includes the orientation detecting unit 251 and the secondary-information retrieving unit 252 as units that are particularly in close relation to the present invention. It should be noted that the orientation detecting unit 251 corresponds to the "orientation detecting step" recited in the claims.

In the control unit 25 such configured, the orientation detecting unit 251 is a processing unit that detects the image orientation of the image data by way of the orientation detection information in the image data in which the various information (secondary information and orientation detection information) is embedded. In particular, the orientation detecting unit 251 determines the image orientation of the image data by way of the orientation detection information that is, for example, information indicating that the image orientation is "erect", from among the image data stored in the various-information-embedded-image-data storing unit 241, and stores the determined orientation detection information of the image (such as "erect", "inversed", and "unclear") in the orientation-detection-information storing unit 242.

The orientation detecting unit 251 includes an image cutting unit 251a, a block dividing unit 251b, a block extracting unit 251c, an averaging unit 251d, registers 251e, a counting unit 251f, and a determining unit 251g, as illustrated in FIG. 14.

The orientation detecting unit 251 such configured will be explained in further detail. The image cutting unit 251a is provided with a function of clipping valid image data out of the entire image data when the image data includes image data that is not subjected to the decoding (for instance, a blank portion) in its periphery.

The block dividing unit 251b divides the image data clipped out by the image cutting unit 251a into N rows by M columns of blocks, in a similar manner to the division of the original image data illustrated in FIG. 9.

The block extracting unit 251c sequentially extracts, from the top end and the bottom end of the image data divided into blocks by the block dividing unit 251b, pairs of blocks that are adjacent to each other and have feature indices that exhibit a relation that one is larger than the other. The block extracting unit 151b outputs a density distribution of each of the left block and the right block as block density data.

The averaging unit 251d obtains average density data of the left block and average density data of the right block, based on the block density data output by the block extracting unit 251c, and sequentially stores the values in the corresponding registers 251e.

The counting unit 251f determines a bit that corresponds to the magnitude relation between the average density data of the left block stored in the register 251e and the average density data of the right block stored in the register 251e, and performs counting. According to the present embodiment, to count denotes as follows: "1" is represented by a pair of blocks that have the feature indices where "left block<right block", while "0" is represented by a pair of blocks that have the feature indices where "left block>right block". In addition, the bit of "1" is used as orientation detection information indicating that the image data is "erect". Thus, with a counter that records the magnitude relation between the feature index of the left block and the feature index of the right block, the reading of the counter is incremented by 1 if there is any pair of blocks exhibiting "the average density of the left block<the average density of the right block", or in other words, if there is any pair of blocks whose bit is determined as "1". This process is performed on all the pairs of blocks of the orientation detection information.

If the reading of the counter recorded by the counting unit 251f is greater than half the number of entire pairs of blocks of the orientation detection information, the determining unit 251g determines that the image orientation of the image data is "erect". If the reading of the counter is less than half the number of entire pairs of blocks of the orientation detection information, it is determined that the image orientation of the image data is "inversed". In any other case, the image orientation of the image data is determined to be "unclear". The determining unit 251g then stores the determined orientation detection information of the image (such as "erect", "inversed", and "unclear") in the orientation-detection-information storing unit 242.

The secondary-information retrieving unit 252 retrieves the secondary information from the image data in which the various information is embedded by way of the image data in which the various information (the secondary information and the orientation detection information) is embedded and the orientation detection information. In particular, for example, when the orientation detection information indicates "inverted", the image data in which the various information is embedded is inverted by way of the image data stored in the various-information-embedded-image-data storing unit 241 and the orientation detection information stored in the orientation-detection-information storing unit 242. Then, the secondary information is retrieved to store in the secondary-information storing unit 243.

FIG. 15 is a block diagram of the structure of the secondary-information retrieving unit 252 according to the first embodiment. The secondary-information retrieving unit 252 includes a block extracting unit 252a, an averaging unit 252b, registers 252c, a comparing unit 252d, and a decoding unit 252e, as illustrated in FIG. 15.

The secondary-information retrieving unit 252 such configured will be explained more specifically. The block extracting unit 252a sequentially extracts pairs of blocks that are adjacent to each other and have the feature indices one of which is larger than the other from blocks of the image data that are divided into blocks by the block dividing unit 251b except for blocks at the top end and the bottom end of the image data. Then, the block extracting unit 252a outputs the density distributions of the left blocks and the right blocks as block density data.

The averaging unit 252b obtains average density data of the left block and average density data of the right block, based on the block density data output by the block extracting unit 252a, and sequentially stores the values in the corresponding registers 252c.

Based on the magnitude relation between the average density data of the left block stored in the register 252c and the average density data of the right block stored in the register 252c, the comparing unit 252d judges the corresponding bit. It should be noted that there is more than one judgment result because the secondary information is repeatedly embedded in the image data.

The decoding unit 252e determines bits based on the multiple judgment results made by the comparing unit 252d, in accordance with majority rule for each bit. The bits are determined and stored as secondary information in the secondary-information storing unit 243.

Figure 16:
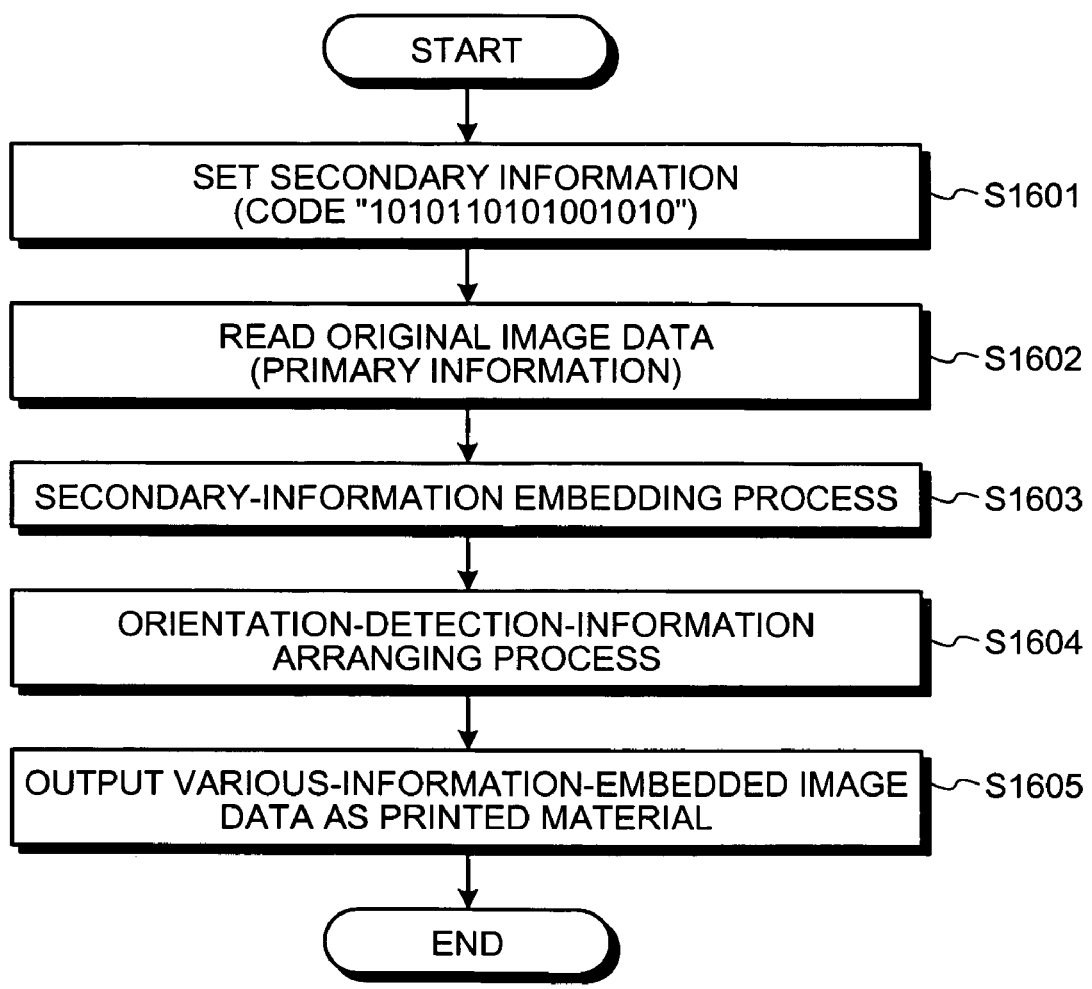
FIG. 16 is a flowchart of the procedure of an encoding process according to the first embodiment.
Figure 17:
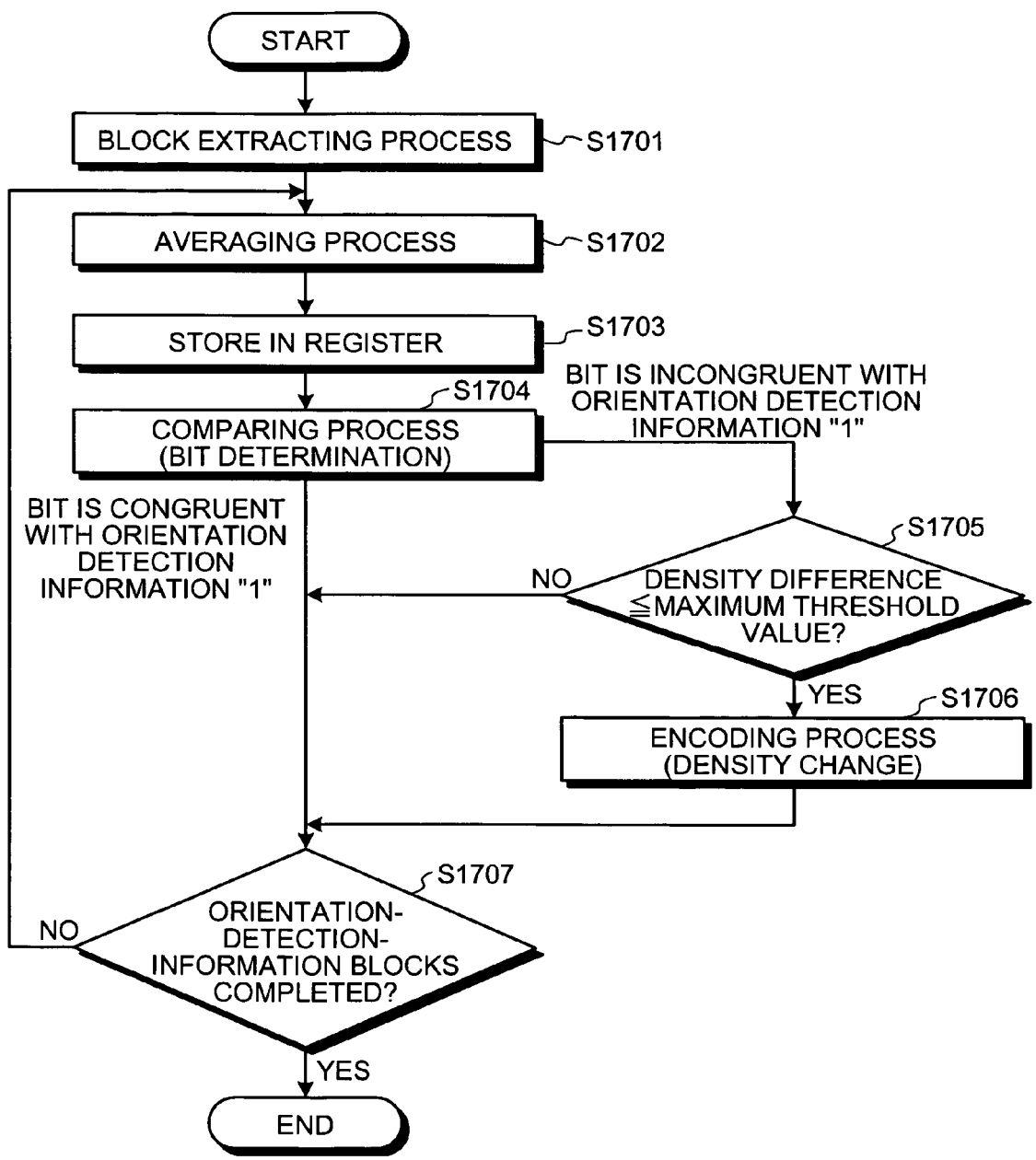
FIG. 17 is a flowchart of the procedure of an orientation-detection-information arranging process according to the first embodiment.

FIG. 16 is a flowchart for explaining the procedure of the encoding process according to the first embodiment. FIG. 17 is a flowchart for explaining the procedure of the orientation-detection-information arranging process according to the first embodiment.

As illustrated in FIG. 16, the encoder 10 receives the setting of the secondary information (a 16-bit code represented as "1010110101001010", for instance) from the input unit, and stores the received information in the secondary-information storing unit 142 (Step S1601).

Furthermore, the encoder 10 reads the original image data, which is the primary information, from the input unit, and stores it in the original-image-data storing unit 141 (Step S1602).

Then, the secondary-information embedding unit 151 embeds the secondary information stored in the secondary-information storing unit 142 in the original image data stored in the original-image-data storing unit 141, and stores it in the secondary-information-embedded-image-data storing unit 143 (Step S1603).

Thereafter, the orientation-detection-information arranging unit 152 arranges the orientation detection information in the image data stored in the secondary-information-embedded-image-data storing unit 143, stores it in the various-information-embedded-image-data storing unit 144 (Step S1604), and outputs it from the output unit as printed material or the like (Step S1605).

As illustrated in FIG. 17, the block extracting unit 152a sequentially extracts pairs of blocks that are adjacent to each other and have the feature indices one of which is greater than the other, from the top end and the bottom end of the image data stored in the secondary-information-embedded-image-data storing unit 143, and outputs the density distributions of the left blocks and the right blocks as the block density data (Step S1701).

The averaging unit 152b obtains average density data of the left block and average density data of the right block, based on the output block density data (Step S1702), and sequentially stores the values in the corresponding registers 152c (Step S1703).

Then, based on the magnitude relation between the average density data of the left block stored in the register 152c and the average density data of the right block stored in the register 152c, the comparing unit 152d determines the corresponding bit (Step S1704) and compares the determination result with the bits of the orientation detection information.

When the comparison result produced by the comparing unit 152d is "incongruent", the encoding unit 152e determines whether the difference between the densities of the left block and the right block is equal to or less than the predetermined maximum threshold value (Step S1705). When it is equal to or less than the maximum threshold value, the encoding unit 152e makes changes to the densities (Step S1706). When it exceeds the maximum threshold value, no change is made to the densities.

Moreover, when the comparison result produced by the comparing unit 152d is "congruent", the encoding unit 152e maintains the magnitude relation between the average density of the left block and the average density of the right block. Thereafter, the orientation-detection-information arranging unit 152 repeats the processes of the steps S1701 through S1701 described above. The orientation-detection-information arranging process is terminated when it is completed with the orientation detection information blocks of the image data stored in the secondary-information-embedded-image-data storing unit 143 (Step S1701, Yes).

Figure 18:
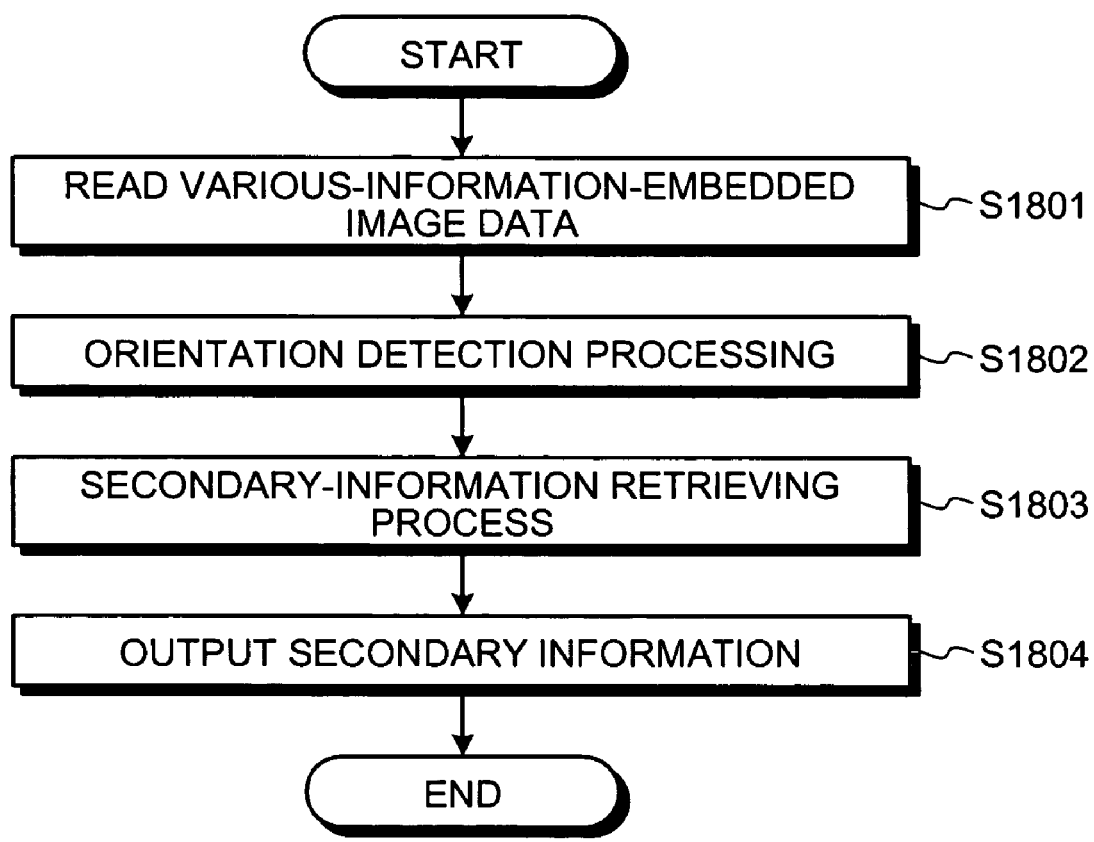
FIG. 18 is a flowchart of the procedure of a decoding process according to the first embodiment.
Figure 19:
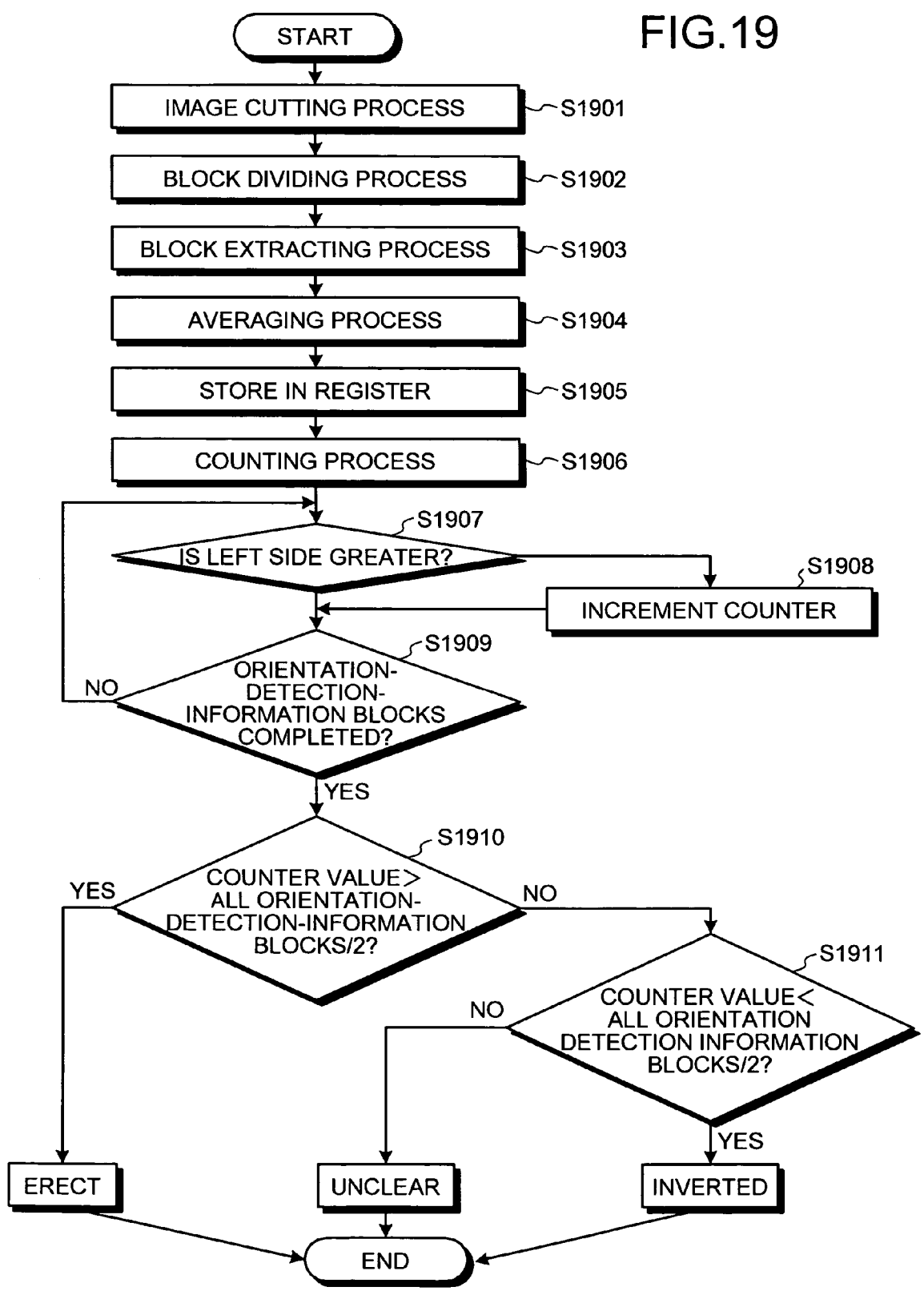
FIG. 19 is a flowchart of the procedure of an orientation detecting process according to the first embodiment.

FIG. 18 is a flowchart for explaining the procedure of the decoding process according to the first embodiment. FIG. 19 is a flowchart for explaining the procedure of the orientation detecting process according to the first embodiment.

As illustrated in FIG. 18, the decoder 20 reads the image data in which the various information is embedded, and stores it in the various-information-embedded-image-data storing unit 241 (Step S1801).

Then, based on the image data stored in the various-information-embedded-image-data storing unit 241, the orientation detecting unit 251 determines the image orientation of the image data by way of the orientation detection information, and stores the determined orientation detection information of the image in the orientation-detection-information storing unit 242 (Step S1802).

The secondary-information retrieving unit 252 retrieves secondary information from the image in which the various information is embedded by way of the image data stored in the various-information-embedded-image-data storing unit 241 and the orientation detection information stored in the orientation-detection-information storing unit 242 (Step S1803), and outputs it from the output unit (Step S1804).

As illustrated in FIG. 19, the image cutting unit 251a clips valid image data out of the entire image data when the image data stored in the various-information-embedded-image-data storing unit 241 includes image data that is not subjected to decoding (such as a blank portion) in its circumference (Step S1901).

The block dividing unit 251b divides the image data cut out by the image cutting unit 251a to N rows by M columns of blocks (Step S1902).

Then, the block extracting unit 251c sequentially extracts pairs of blocks that are adjacent to each other and have the feature indices one of which is greater than the other from the top end and the bottom end of the image data that is divided into blocks by the block dividing unit 251b, and outputs the density distributions of the left blocks and the right blocks as block density data (Step S1903).

The averaging unit 251d obtains the average density data of the left block and the average density data of the right block based on the block density data output by the block extracting unit 251c (Step S1904), and stores each value in the corresponding register 251e (Step S1905).

Based on the magnitude relation between the average density data of the left block stored in the register 251e and the average density data of the right block stored in the register 251e, the counting unit 251f determines the corresponding bit and performs counting (Step S1906). Here, if there is any pair of blocks where "the average density data of the left block<the average density data of the right block", or in other words, if there is any pair of blocks for which the bit is determined as "1" (Step S1907), the reading of the counter is incremented by 1 (Step S1908).

Thereafter, the counting unit 251$f$ repeats the processes of the step S1907 through S1908 described above, and terminates the counting process when it is completed with the orientation detection information blocks of the image data stored in the various-information-embedded-image-data storing unit 241 (Step S1909, Yes).

Then, the determining unit 251$g$ determines that the image orientation of the image data is "erect" if the counter reading recorded by the counting unit 251$f$ is greater than half the number of all the pairs of blocks for the orientation detection information (Step S1910, Yes), that the image orientation of the image data is "inverted" if the counter reading recorded by the counting unit 251$f$ is less than half the number of all the pairs of blocks for the orientation detection information (Step S1911, Yes), and that the image orientation of the image data is "unclear" in any other cases (Step S1911, No).

As described above, according to the first embodiment, the orientation detection information is arranged in at least two positions that are symmetric with respect to the center of the image. Thus, by detecting the image orientation by way of this orientation detection information on the decoder side, blocks for the orientation detection information only are recognized as blocks for the orientation detection information in either case of the image orientation being "erect" or "inverted". Blocks other than the orientation detection information are therefore not mistaken for blocks for the orientation detection information. Because an error is avoided in determining the image orientation in increments of 180 degrees, the image can be processed in the correct direction.

Furthermore, according to the first embodiment, pairs of blocks that are adjacent to each other and have the feature indices one of which is greater than the other are arranged as orientation detection information. Thus, with the image processing program, the orientation detection information is arranged by using a characteristic that the feature indices (such as average density, granularity, color saturation, and centralization/decentralization of density) approximate to each other especially in the neighboring image data. As a result, the orientation detection information can be arranged without significantly deteriorating the quality of the original image data. On the other hand, on the decoder side, the image can be processed in the correct direction once the magnitude relation the feature indices is found, by using this orientation detection information to detect the image orientation. Thus, the image can be processed in the correct direction by simple comparison. In addition, when the image orientation is inversed in 180-degree increments, the magnitude relation of the orientation detection information arranged in at least two positions is reversed, which ensures that the image are processed in the correct direction. Furthermore, a method using pairs of blocks that are adjacent to each other and have the feature indices one of which is greater than the other is known as a method of embedding, in original image data, additional information (such as a code) that is unperceivable for human. The image processing program embeds the orientation detection information in accordance with an algorithm that resembles to this method. As a result, an image can be processed in the correct direction while maintaining high affinity for a technology adopting such a method.

Moreover, according to the first embodiment, the orientation detection information is arranged in plural positions in areas that are symmetric to the center of the image. By using this orientation detection information on the decoder side to detect the image orientation, the image orientation can be detected even if the quality of the image data acquired by the decoder is partially deteriorated, containing orientation detection information unusable for determination or orientation detection information that may lead to misjudgment, by using the remaining orientation detection information. Hence, the image can be processed in the correct direction with high accuracy.

Furthermore, according to the first embodiment, the image orientation is detected by way of the orientation detection information of the image in which the orientation detection information is arranged in at least two positions that are symmetric to the center of the image. The decoder therefore recognizes only orientation detection information blocks as orientation detection information blocks, without mistaking blocks other than the orientation detection information as orientation detection information blocks. Because the image orientation would not be misjudged in 180-degree increments, the image can be processed in the correct direction.

Moreover, according to the first embodiment, the image orientation is detected by using, as orientation detection information, pairs of blocks that are adjacent to each other and have the feature indices one of which is greater than the other. Thus, the decoder can process the image in the correct direction as far as it can judge the magnitude relation of the feature indices. The image can therefore be processed in the correct direction simply by comparing them. In addition, when the image orientation is inversed in 180-degree increments, the magnitude relation of the orientation detection information arranged in at least two positions is reversed, ensuring that the image is processed in the correct direction.

Furthermore, according to the first embodiment, by using such printed material, the image orientation is detected on the decoder side by using this orientation detection information. Thus, orientation detection information blocks only are recognized as orientation detection information blocks in either case of the image orientation being "erect" or "inverted". Because blocks other than the orientation detection information are prevented from being mistakenly recognized as the orientation detection information blocks, preventing the image orientation from being erroneously determined in 180-degree increments, the image can be processed in the correct direction.

The image processing apparatus according to the first embodiment has been explained. However, the present invention can be realized in various different modes other than the first embodiment. For this reason, a different embodiment will be explained below as an image processing apparatus according to a second embodiment of the present invention.

According to the first embodiment, the use of pairs of blocks that are two adjacent blocks and have the feature indices one of which is greater than the other has been explained. The present invention, however, is not limited thereto, and they may be two blocks that are not adjacent to each other.

In addition, although the use of an average density as the feature index has been explained in the first embodiment, the present invention is not limited thereto. The indices of other features that can be obtained from granularity, color saturation, or centralization/decentralization of density of the image may be adopted.

Furthermore, according to the first embodiment, the arrangement of the orientation detection information at multiple positions in areas that are symmetric with respect to the center of the image has been explained. However, the present invention is not limited thereto. A piece of the orientation detection information may be arranged in each of at least two areas that are symmetric with respect to the center.

Figure 20:
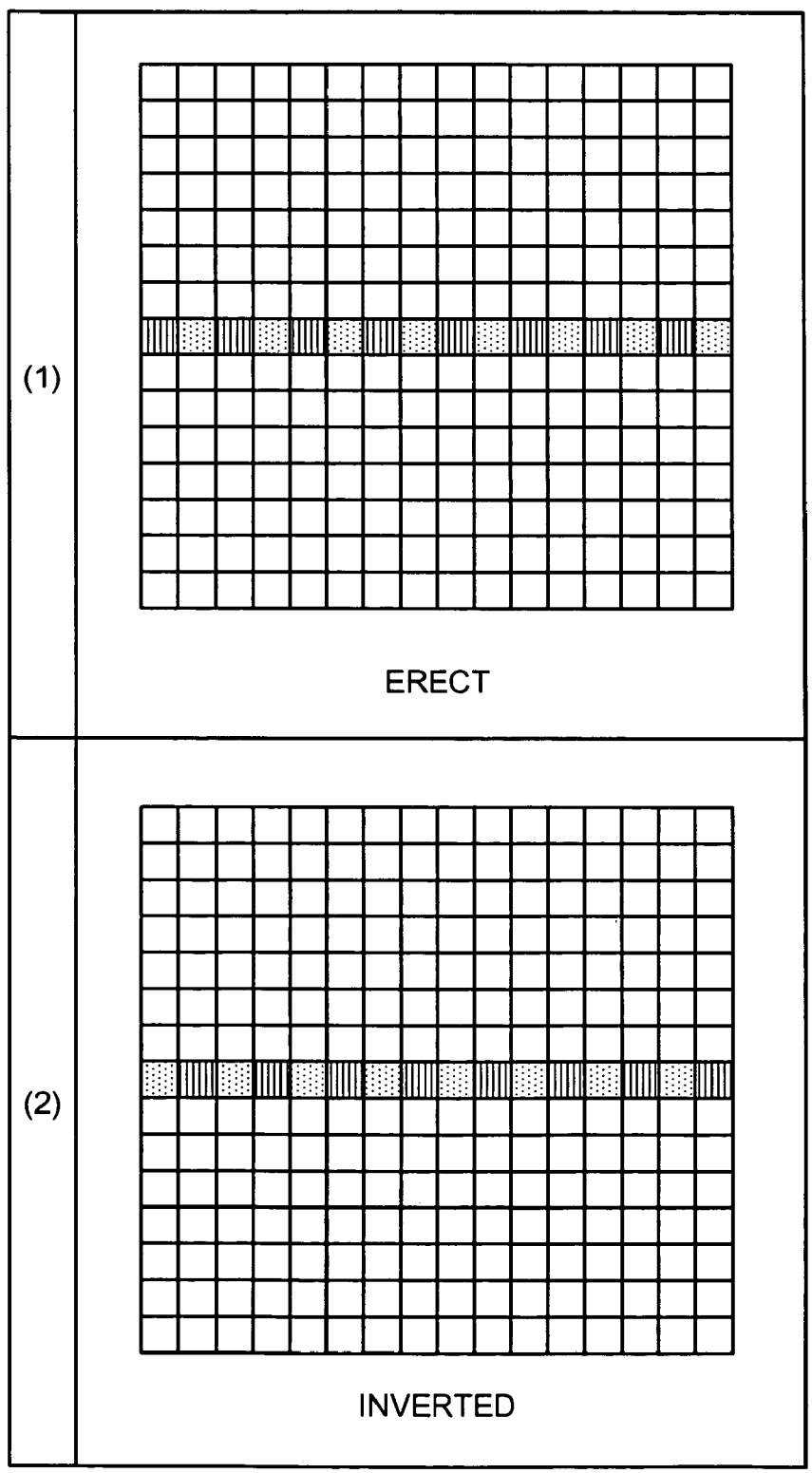
FIG. 20 is a diagram for explaining image data with the orientation detection information arranged in the center thereof.

Moreover, according to the first embodiment, the arrangement of the orientation detection information at the top end and the bottom end of the image has been explained. However, the present invention is not limited thereto. The orientation detection information can be arranged in the center of the image, as illustrated in FIG. 20.

In such a case, because the orientation detection information is arranged in the center of the image, two pieces of orientation detection information are arranged as one combined piece. As a result, the original image data used for the orientation detection information to detect the orientation is cut down so that the original image data can be used more to embed other information in, and the decoder can determine the orientation by way of a smaller, integrated piece of image data. Thus, the image can be effectively processed in the correct direction.

Figure 21:
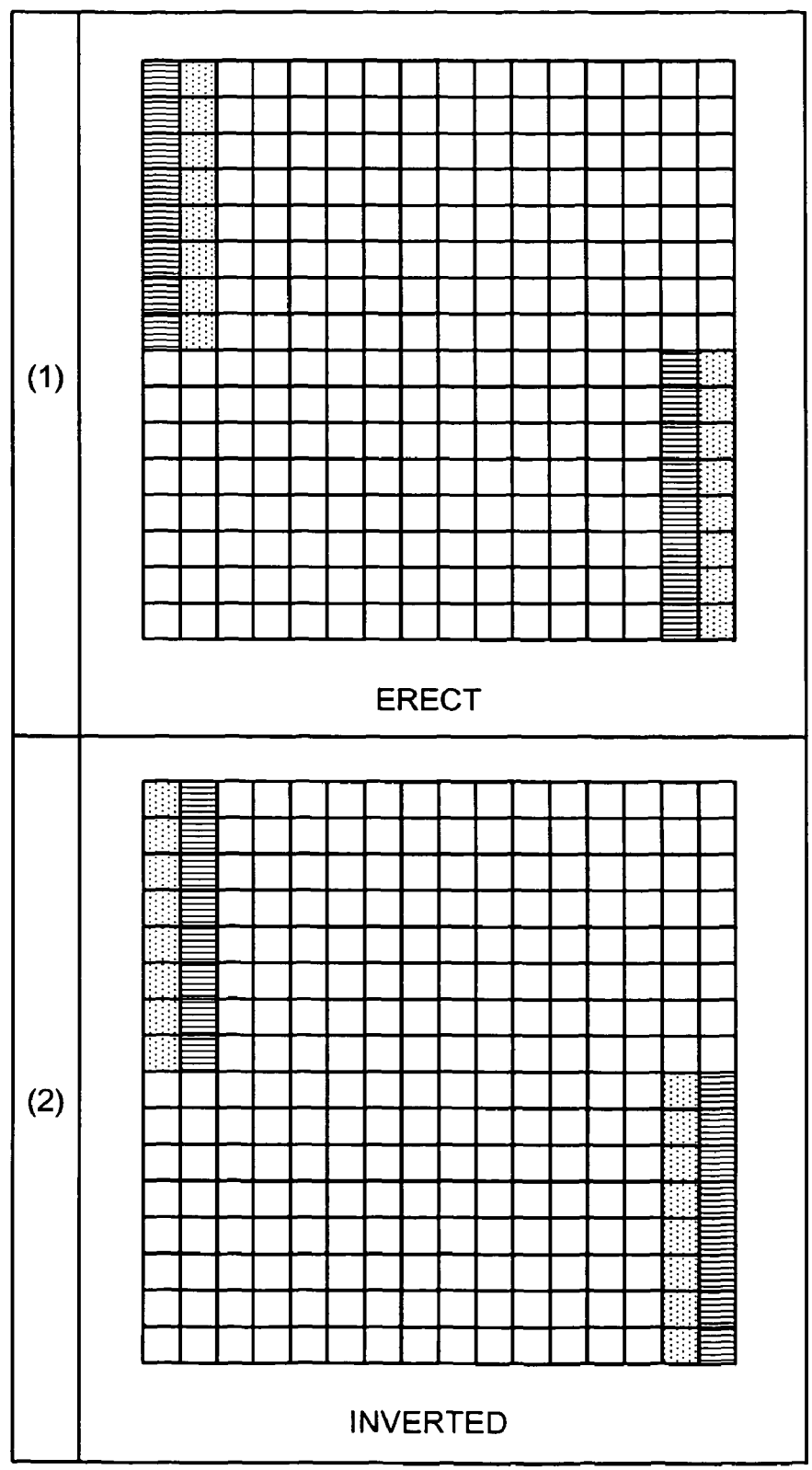
FIG. 21 is a diagram for explaining image data with the orientation detection information arranged at the left end and the right end thereof.

Furthermore, according to the first embodiment, the arrangement of the orientation detection information at the top end and bottom end of the image has been explained, but the present invention is not limited thereto. The orientation detection information may be arranged at the left end and the right end of the image, as illustrated in FIG. 21.

In such a case, because the orientation detection information is arranged at the left end and the right end of the image, the orientation detection information can be arranged, on the encoder side of the image processing apparatus, even in an image in which no additional information (such as a code to be embedded in original image data in a manner unperceivable for human) can be embedded at the top end and the bottom end of the original image data, and the orientation detection information can be detected by the decoder.

Figure 22:
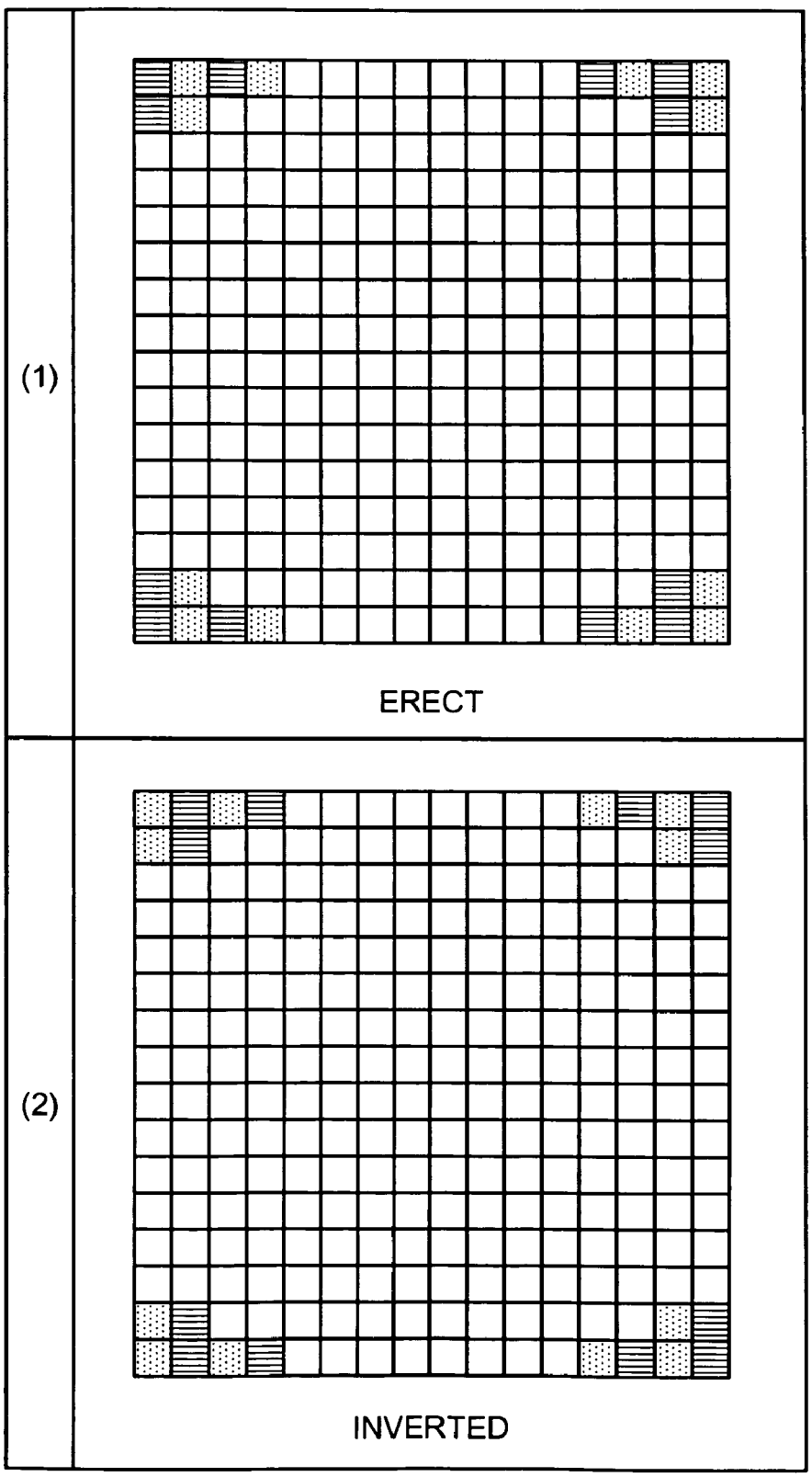
FIG. 22 is a diagram for explaining image data with the orientation detection information arranged in the four corners thereof.

Moreover, according to the first embodiment, the arrangement of the orientation detection information at the top end and the bottom end of the image has been explained, but the present invention is not limited thereto. The orientation detection information may be arranged in the four corners of the image, as illustrated in FIG. 22.

In such a case, because the orientation detection information is arranged in the four corners of the image, the orientation detection information can be arranged, on the encoder side of the image processing apparatus, even in an image in which no additional information (such as a code to be embedded in original image data in a manner unperceivable for human) can be embedded at the top end and the bottom end of the original image data or an image in which no additional information can be embedded at the left end and the right end of the original image data, and the orientation detection information can be detected by the decoder.

Figure 23:
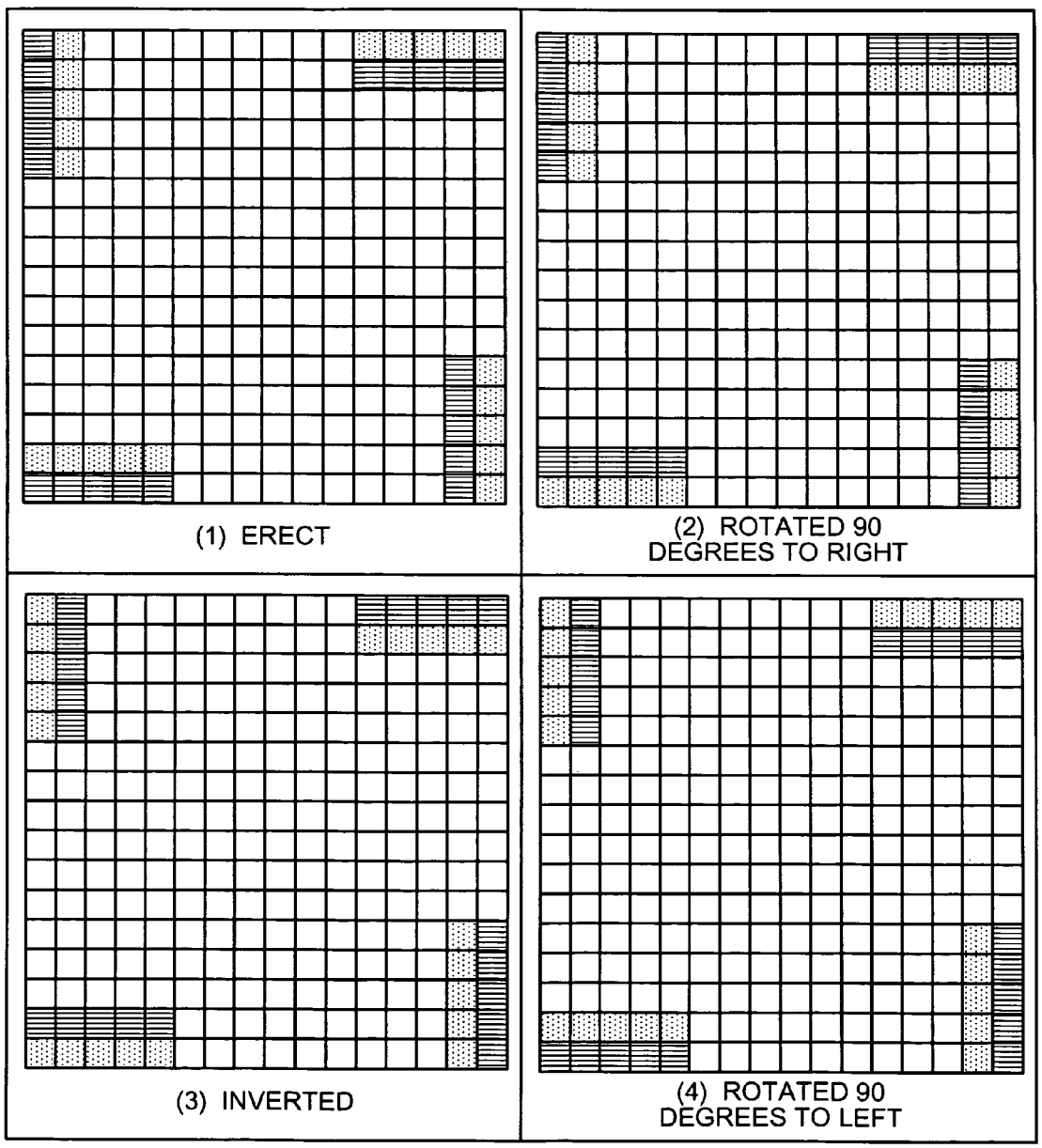
FIG. 23 is a diagram for explaining image data with the orientation detection information arranged in positions that are symmetric with respect to two axes.

Furthermore, according to the first embodiment, the arrangement of the orientation detection information in at least two positions that are symmetric with respect to the center of the image has been explained. However, the orientation detection information may be arranged in at least four positions that are symmetric with respect to two axes of the image, as illustrated in FIG. 23.

In such a case, because the orientation detection information is arranged in at least four positions that are symmetric with respect to the two axes of the image, the decoder of the image processing apparatus recognizes only orientation detection information blocks as orientation detection-information blocks, in any of the cases of the image orientation being "erect", "inverted", "rotated 90 degrees to the right", or "rotated 90 degrees to the left". Because blocks other than the orientation detection information would not be erroneously recognized as orientation detection information blocks and the image orientation would not be misjudged in 90-degree increments, the image can be processed in the correct direction.

Figure 24:
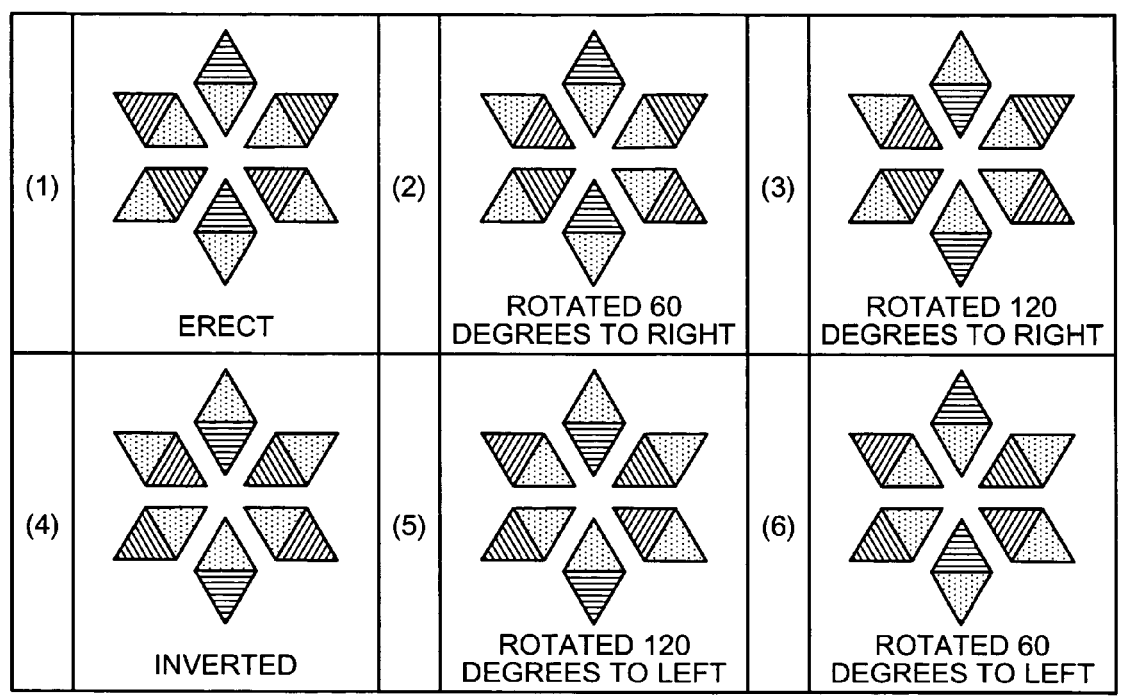
FIG. 24 is a diagram for explaining image data with the orientation detection information arranged in positions that are symmetric with respect to three axes.

Moreover, according to the first embodiment, a case in which the orientation detection information is arranged in two positions that are symmetric with respect to the center of the image has been explained. However, the orientation detection information may be arranged in at least six positions that are symmetric to three axes of the image, as illustrated in FIG. 24.

In such a case, because the orientation detection information is arranged in at least six positions that are symmetric to the three axes of the image, the decoder of the image processing apparatus recognizes only orientation detection information blocks as orientation detection information blocks, in any of the cases of the image orientation being "erect", "inverted", "rotated 60 degrees to the right", "rotated 120 degrees to the right", "rotated 120 degrees to the left", or "rotated 60 degrees to the left". Because blocks other than the orientation detection information would not be erroneously recognized as orientation detection information blocks and the image orientation would not be misjudged in 60-degree increments, the image can be processed in the correct direction.

Furthermore, according to the first embodiment, an application to a technology called steganography in which additional information (secondary information) unperceivable for human is embedded in the original image (primary information) and the secondary information is retrieved on the side of receiving this image has been explained. The present invention is not limited thereto, however. The present invention is equally applicable to image processing by technologies such as the optical character reader (OCR), as illustrated in FIG. 25.

Figure 25:
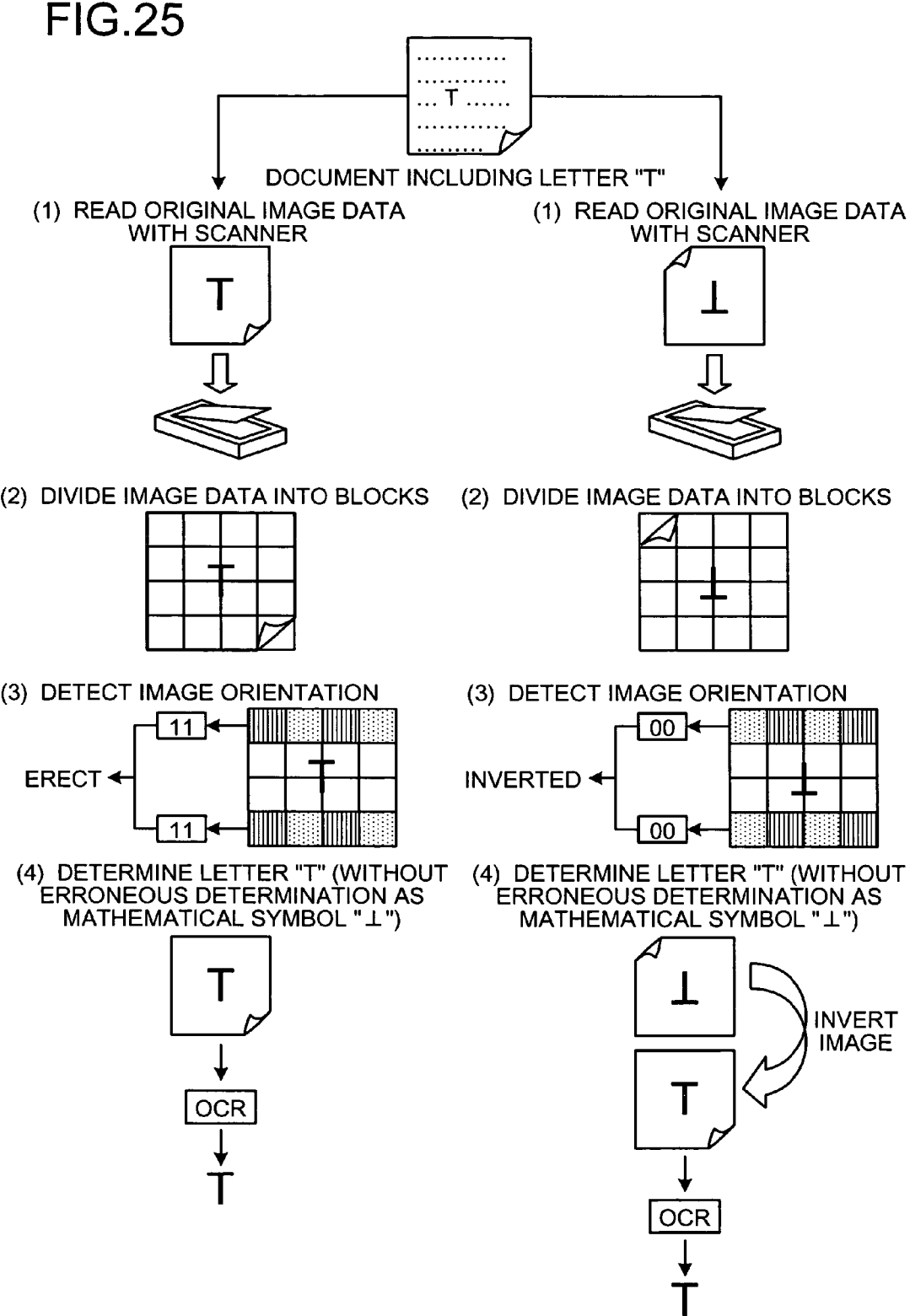
FIG. 25 is a diagram for explaining the overview and the features of an image processing apparatus according to a second embodiment of the present invention.

FIG. 25 is a diagram for explaining the overview and features of an image processing apparatus according to the second embodiment.

The document including a letter "T" illustrated in FIG. 25 is image data in which orientation detection information is arranged in the process performed on the encoder side of an image processing apparatus according to the second embodiment. The image data in which the orientation detection information is arranged is read by a scanner or the like to a decoder of the image processing apparatus (refer to (1) in FIG. 25). In the illustration on the left in (1) of FIG. 25, because the document including the letter "T" is read in the erect orientation by the scanner, the decoder of the image processing apparatus acquires image data whose image orientation is "erect". At this point, however, the decoder of the image processing apparatus has not detected that the image orientation of the acquired image data is "erect". On the other hand, in the illustration on the right in (1) of FIG. 25, because the document including the letter "T" is read in the inverted orientation by the scanner, the decoder of the image processing apparatus acquires image data whose image orientation is "inverted". At this point, however, the decoder of the image processing apparatus has not detected that the image orientation of the acquired image data is "inverted". Then, the decoder of the image processing apparatus divides the image data into blocks (refer to (2) in FIG. 25).

Thereafter, the decoder of the image processing apparatus uses several pieces of orientation detection information arranged at the top end and the bottom end of the image data to detect the image orientation of the image data (refer to (3) in FIG. 25). In other words, according to the present embodiment, because a bit "1" is arranged as information indicating that the original image data is "erect", the decoder of the image processing apparatus uses several pairs of blocks indicating the bits "1" arranged at the top end and the bottom end of the image data to detect that the image orientation of the image data is "erect", in the illustration on the left of (3) of FIG. 25. On the other hand, according to the present embodiment, because a bit "0" is arranged as information indicating that the original image data is "inverted", the decoder of the image processing apparatus uses several pairs of blocks indicating the bits "0" arranged at the top end and the bottom end of the image data to detect that the image orientation of the image data is "inverted", in the illustration on the right of (3) of FIG. 25. Here, the decoder of the image processing apparatus recognizes only orientation detection information blocks as orientation detection information blocks and would not mistake blocks other than the orientation detection information for orientation detection information blocks in either case of the image orientation being "erect" or "inverted".

In this manner, the decoder of the image processing apparatus directly determines with the OCR technology that the letter is "T" when the image orientation of the image data is "erect", as shown in the illustration on the left in (4) of FIG. 25. When the image orientation of the image data is "inverted", the letter is determined as "T" with the OCR technology after inverting the image, as shown in the illustration on the right in (4) of FIG. 25.

Figure 26:
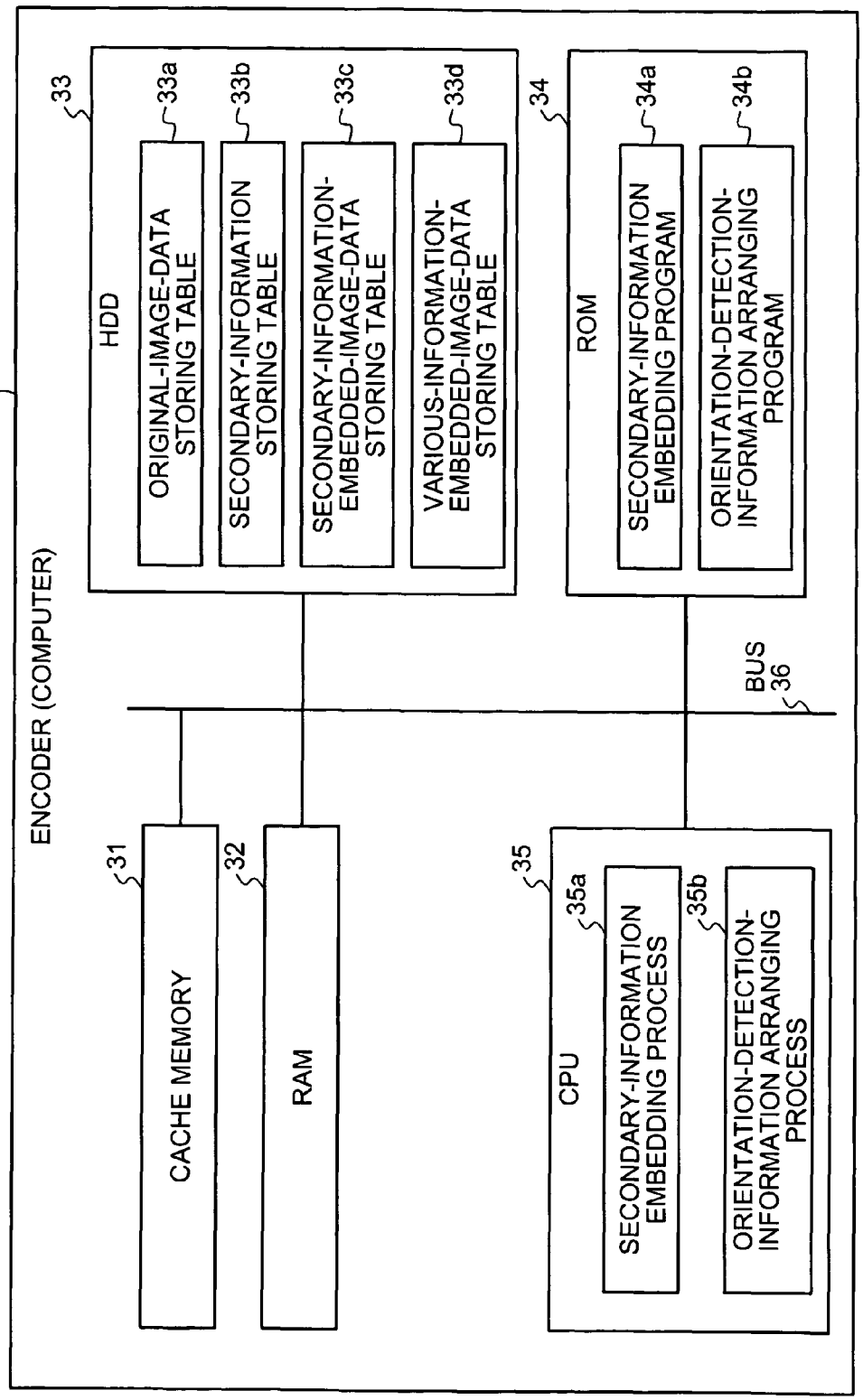
FIG. 26 is a diagram of a computer that executes an encoding program.
Figure 27:
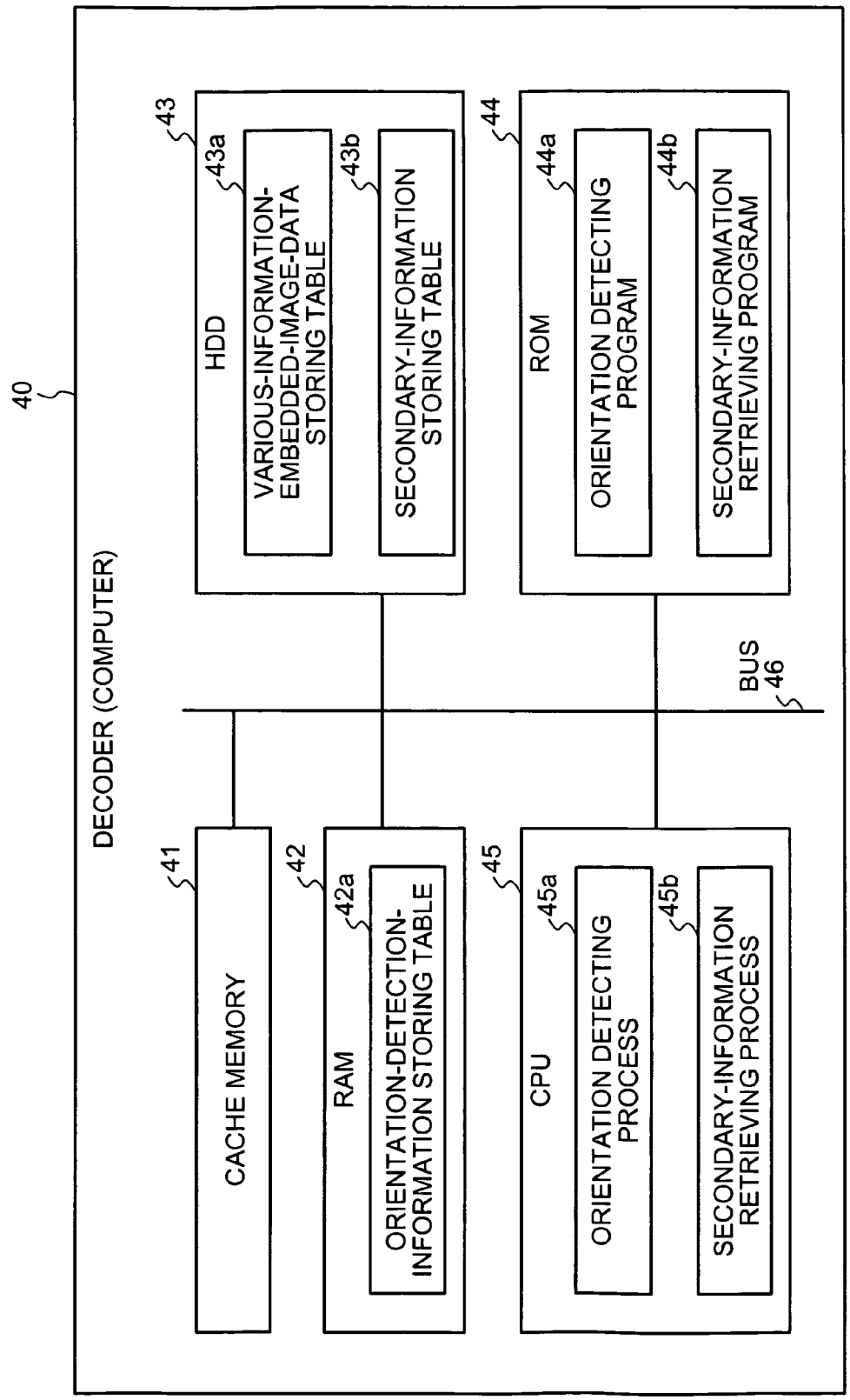
FIG. 27 is a diagram of a computer that executes a decoding program.

The processes explained in the first embodiment can be realized by executing a prepared program on a computer such as a personal computer and a workstation. Thus, an example of a computer that executes an image processing program having similar functions to the first embodiment will be explained. FIG. 26 is a diagram of a computer 30 executing an encoding program. FIG. 27 is a diagram of a computer 40 executing a decoding program.

As illustrated in FIG. 26, the computer 30, which serves as an encoder, is constituted with a cache memory 31, a random access memory (RAM) 32, a hard disk drive (HDD) 33, a read only memory (ROM) 34, and a central processing unit (CPU) 35 that are connected with a bus 36. Here, an encoding program that carries out functions similar to the first embodiment, namely a secondary-information embedding program 34a and an orientation-detection-information arranging program 34b, are stored beforehand in the ROM 34, as illustrated in FIG. 26.

Then, when the CPU 35 reads out and executes the programs 34a and 34b, the programs 34a and 34b function as a secondary-information embedding process 35a and an orientation-detection-information arranging process 35b, respectively, as illustrated in FIG. 26. It should be noted that the processes 35a and 35b correspond to the secondary-information embedding unit 151 and the orientation-detection-information arranging unit 152, respectively, illustrated in FIG. 4.

Moreover, the HDD 33 is provided with an original-image-data storing table 33a, a secondary-information storing table 33b, a secondary-information-embedded image data storing table 33c, and a various-information-embedded-image-data storing table 33d, as illustrated in FIG. 26. It should be noted that the tables 33a, 33b, 33c, and 33d correspond to the original-image-data storing unit 141, the secondary-information storing unit 142, the secondary-information-embedded-image-data storing unit 143, and the various-information-embedded-image-data storing unit 144, respectively, illustrated in FIG. 4.

It is not always necessary to store the programs 34a and 34b in the ROM 34. They may be stored in a "portable physical medium" such as a flexible disk (FD), a compact disk-read only memory (CD-ROM), a magneto-optical (MO) disk, a digital versatile disk (DVD), and an integrated-circuit (IC) card; a "fixed physical medium" such as an HDD provided internally or externally in the computer 30; or "another computer (or server)" connected to the computer 30 through a public line, an internet, a local area network (LAN), or a wide area network (WAN), so that the computer 30 can read out and execute a program therefrom.

The computer 40, which serves as a decoder, is constituted with a cache memory 41, a RAM 42, an HDD 43, a ROM 44, and a CPU 45 that are connected with a bus 46, as illustrated in FIG. 27. Here, a decoding program that carries out functions similar to the first embodiment, namely an orientation detecting program 44a and a secondary-information retrieving program 44b, are stored beforehand in the ROM 44, as illustrated in FIG. 27.

Then, when the CPU 45 reads out and executes the programs 44a and 44b, the programs 44a and 44b function as an orientation detecting process 45a and a secondary information retrieving process 45b, respectively, as illustrated in FIG. 27. It should be noted that the processes 45a and 45b correspond to the orientation detecting unit 251 and the secondary-information retrieving unit 252, respectively, illustrated in FIG. 13.

The RAM 42 is provided with an orientation-detection-information storing table 42a, as shown in FIG. 27. It should be noted that the table 42a corresponds to the orientation-detection-information storing unit 242 shown in FIG. 13.

The HDD 43 is provided with a various-information-embedded-image-data storing table 43a and a secondary-information storing table 43b, as shown in FIG. 27. It should be noted that the tables 43a and 43b correspond to the various-information-embedded-image-data storing unit 241 and the orientation-detection-information storing unit 242 shown in FIG. 13.

It is not always necessary to store the programs 44a and 44b in the ROM 44. They may be stored in a "portable physical medium" such as an FD, a CD-ROM, a MO disk, a DVD, and an IC card; a "fixed physical medium" such as an HDD provided internally or externally in the computer 40; or "another computer (or server)" connected to the computer 40 through a public line, an internet, a LAN, or a WAN, so that the computer 40 can read out and execute the programs therefrom.

Furthermore, among the processes explained in the present embodiment, the entire processes or part of the processes that are explained as being automatically performed may be manually performed. Conversely, the entire processes or part of the processes that are explained as being manually performed in the explanation may be automatically performed in accordance with a publicly known method. Additionally, the processing procedure, the controlling procedure, the specific names, and the information including various types of data and parameters that have been described above in the text and the drawings may be modified in an arbitrary manner unless otherwise specified.

Furthermore, the components of the illustrated devices are functionally conceptual ones, and do not always have to be physically configured as illustrated. In other words, specific modes of disintegrating and integrating each device do not have to be limited to the drawings, but may be configured by entirely or partially disintegrating or integrating in a functional or physical manner by arbitrary units in accordance with various loads and condition of use. In addition, the entire portion or an arbitrary portion of a processing function carried out by each device may be realized by a CPU or a program analyzed and executed by the CPU, or may be realized on hardware using wired logic.

According to an embodiment of the present invention, orientation detection information is arranged in at least two positions that are symmetric with respect to the center of an image. Thus, the orientation of the image is detected on the decoder side from this orientation detection information so that only the orientation detection information blocks are recognized as orientation detection information blocks, in either event of the image orientation being "erect" or "inverted". Because blocks other than orientation detection information would not be erroneously recognized as orientation detection information blocks, a misjudgment of the image orientation in 180-degree increments is avoided, and an image is processed in the correct direction.

Furthermore, according to an embodiment of the present invention, the orientation of an image is detected by way of the orientation detection information from the image on which the orientation detection information is arranged in at least two positions that are symmetric with respect to the center of the image. Thus, the decoder recognizes only the orientation detection information blocks as orientation detection information blocks, in either event of the image orientation being "erect" or "inverted". Because the decoder would not erroneously recognize blocks other than orientation detection information as orientation detection information blocks, a misjudgment of the image orientation in 180-degree increments is avoided, and an image is processed in the correct direction.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing method of embedding orientation detection information for detecting an image orientation in an image, the image processing method comprising:
   embedding, using a processor, the orientation detection information in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

2. The image processing method according to claim 1, wherein
   the orientation detection information is a pair of adjacent blocks that have feature indices showing a magnitude relation.

3. The image processing method according to claim 1, wherein
   the embedding includes embedding a plurality of pieces of orientation detection information in areas that are symmetric with respect to the center of the image.

4. The image processing method according to claim 1, wherein
   the at least two positions are a top end area and a bottom end area of the image.

5. The image processing method according to claim 1, wherein
   the at least two positions are located in a center area of the image.

6. The image processing method according to claim 1, wherein
   the at least two positions are a left end area and a right end area of the image.

7. The image processing method according to claim 1, wherein
   the at least two positions are four corners of the image.

8. The image processing method according to claim 1, wherein
   the embedding includes embedding the orientation detection information in at least four positions that are symmetric with respect to two axes of the image.

9. The image processing method according to claim 1, wherein
   the embedding includes embedding the orientation detection information in at least six positions that are symmetric with respect to three axes of the image.

10. An image processing method of detecting an image orientation by using orientation detection information for detecting the image orientation embedded in an image, the image processing method comprising:
    detecting, using a processor, the image orientation by using the orientation detection information from the image in which the orientation detection information is embedded in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

11. The image processing method according to claim 10, wherein
    the orientation detection information is a pair of adjacent blocks that have feature indices showing a magnitude relation.

12. The image processing method according to claim 10, wherein
    the detecting includes detecting the image orientation by using a plurality of pieces of orientation detection information embedded in areas that are symmetric with respect to the center of the image.

13. The image processing method according to claim 10, wherein
    the at least two positions are a top end area and a bottom end area of the image.

14. The image processing method according to claim 10, wherein
    the at least two positions are located in a center area of the image.

15. The image processing method according to claim 10, wherein
    the at least two positions are a left end area and a right end area of the image.

16. The image processing method according to claim 10, wherein
    the at least two positions are four corners of the image.

17. The image processing method according to claim 10, wherein
    the detecting includes detecting the orientation of the image by using the orientation detection information embedded in at least four positions that are symmetric with respect to two axes of the image.

18. The image processing method according to claim 10, wherein
the detecting includes detecting the orientation of the image by using the orientation detection information embedded in at least six positions that are symmetric with respect to three axes of the image.

19. An image processing apparatus that embeds orientation detection information for detecting an image orientation in an image, the image processing apparatus comprising:
an orientation-detection-information embedding unit that embeds the orientation detection information in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

20. An image processing apparatus that detects an image orientation by using orientation detection information for detecting the image orientation embedded in an image, the image processing apparatus comprising:
an orientation detecting unit that detects the image orientation by using the orientation detection information from the image in which the orientation detection information is arranged in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

21. A printed material on which an image created by an image processing method of embedding orientation detection information for detecting an image orientation in the image is printed, wherein
the image processing method includes embedding, using a processor, the orientation detection information in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

22. A computer-readable recording medium that stores therein an image processing program for embedding orientation detection information for detecting an image orientation in an image, wherein
the image processing program causes a computer to execute embedding the orientation detection information in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

23. A computer-readable recording medium that stores therein an image processing program for detecting an image orientation by using orientation detection information for detecting the image orientation embedded in an image, wherein
the image processing program causes a computer to execute detecting the image orientation by using the orientation detection information from the image in which the orientation detection information is embedded in at least two positions that are symmetric with respect to a center of the image so that, when the orientation detection information embedded in a first position moves to a second position in which the orientation detection information is embedded as a result of a rotation of the image around a center of the image, a pattern of the orientation detection information embedded in the first position becomes an inverted pattern of a pattern of the orientation detection information embedded in the second position.

* * * * *